(12) United States Patent
Weipert

(10) Patent No.: US 9,673,604 B2
(45) Date of Patent: Jun. 6, 2017

(54) COAXIAL CABLE TERMINATOR ASSEMBLY HAVING A SUBSTRATE WITH INNER AND OUTER TERMINATION CONNECTIONS CARRIED BY A CAP

(71) Applicant: Gregory L. Weipert, Peoria, AZ (US)

(72) Inventor: Gregory L. Weipert, Peoria, AZ (US)

( * ) Notice: Subject to any disclaimer, the term of this patent is extended or adjusted under 35 U.S.C. 154(b) by 0 days.

(21) Appl. No.: 15/142,776

(22) Filed: Apr. 29, 2016

(65) Prior Publication Data

US 2016/0329693 A1  Nov. 10, 2016

Related U.S. Application Data

(60) Provisional application No. 62/157,201, filed on May 5, 2015.

(51) Int. Cl.
| H01R 29/00 | (2006.01) |
| H02G 15/02 | (2006.01) |
| H01R 31/08 | (2006.01) |

(52) U.S. Cl.
CPC ........... *H02G 15/025* (2013.01); *H01R 31/08* (2013.01)

(58) Field of Classification Search
CPC .... H01R 9/05; H01R 13/652; H01R 13/7036; H01R 24/38; H01R 31/08; Y10S 439/944
USPC ........................................ 439/188, 578, 944
See application file for complete search history.

(56) References Cited

U.S. PATENT DOCUMENTS

| 3,321,732 A | 5/1967 | Forney, Jr. |
| 3,372,364 A | 3/1968 | O'Keefe et al. |
| 3,539,976 A | 11/1970 | Reynolds |
| 3,980,380 A | 9/1976 | Cieniawa et al. |
| 4,316,115 A * | 2/1982 | Wilson ................ A61B 8/0875 310/327 |
| 4,374,606 A | 2/1983 | Lathrop |
| 4,664,467 A | 5/1987 | Tengler et al. |
| 4,941,831 A | 7/1990 | Tengler et al. |
| 5,186,656 A | 2/1993 | Harwath et al. |
| 5,237,293 A | 8/1993 | Kan et al. |
| 5,639,258 A * | 6/1997 | Clark .................. H01R 4/2429 439/404 |
| 5,662,480 A * | 9/1997 | Togashi ............... H01R 24/50 439/582 |
| 6,019,622 A * | 2/2000 | Takahashi ............ H01R 24/46 200/51.1 |
| 6,270,367 B1 | 8/2001 | Bussard |
| 6,712,622 B1 * | 3/2004 | Self .................... H01R 31/065 439/638 |

(Continued)

*Primary Examiner* — Chandrika Prasad
(74) *Attorney, Agent, or Firm* — Michael W. Goltry; Robert A. Parsons; Parsons & Goltry

(57) ABSTRACT

A coaxial cable terminator assembly includes an electrically insulative substrate carried by a non-conductive cap in a receiving area thereof. The substrate carries outer and inner termination connections and an electrically resistive connector that electrically connects the outer termination connection to the inner termination connection. Outer and inner contacts are electrically connected to the outer and inner termination connections, respectively. The outer and inner contacts are for electrically contacting coaxial outer and inner conductors, respectively, of the end of a coaxial cable for terminating the end of the coaxial cable, and the cap is for frictionally and non-conductively engaging the coaxial cable, when the end of the coaxial cable is inserted into the receiving area.

10 Claims, 27 Drawing Sheets

(56) References Cited

U.S. PATENT DOCUMENTS

| | | | | |
|---|---|---|---|---|
| 7,372,428 B1* | 5/2008 | King | ........................ | H01Q 3/08 |
| | | | | 343/840 |
| 7,896,672 B2* | 3/2011 | Felisilda De La Cruz | .................. | H01R 13/6625 |
| | | | | 200/51.1 |
| 2005/0277330 A1 | 12/2005 | Kisling et al. | | |
| 2005/0285604 A1* | 12/2005 | Shinohara | .......... | G01R 31/1281 |
| | | | | 324/557 |
| 2006/0094297 A1* | 5/2006 | Wang | ........................ | H01R 4/16 |
| | | | | 439/578 |
| 2009/0278622 A1* | 11/2009 | Phuyal | ...................... | H01P 5/02 |
| | | | | 333/33 |
| 2013/0130542 A1* | 5/2013 | Tajiri | ........................ | H01R 9/05 |
| | | | | 439/578 |

* cited by examiner

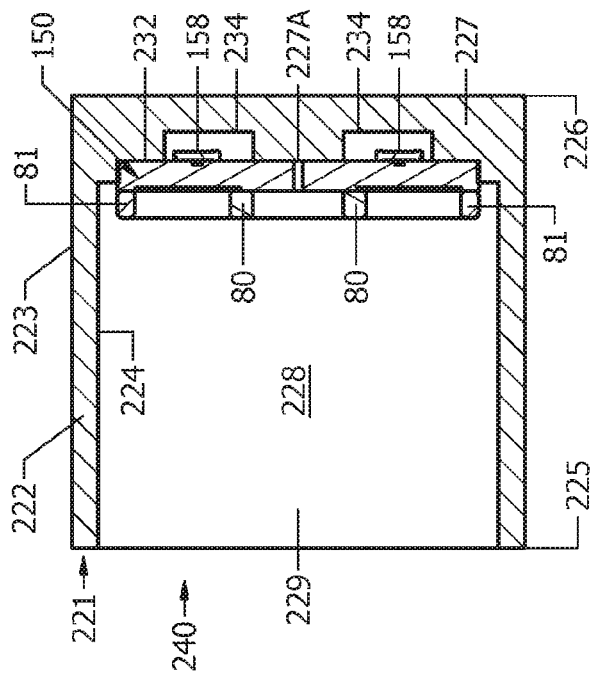
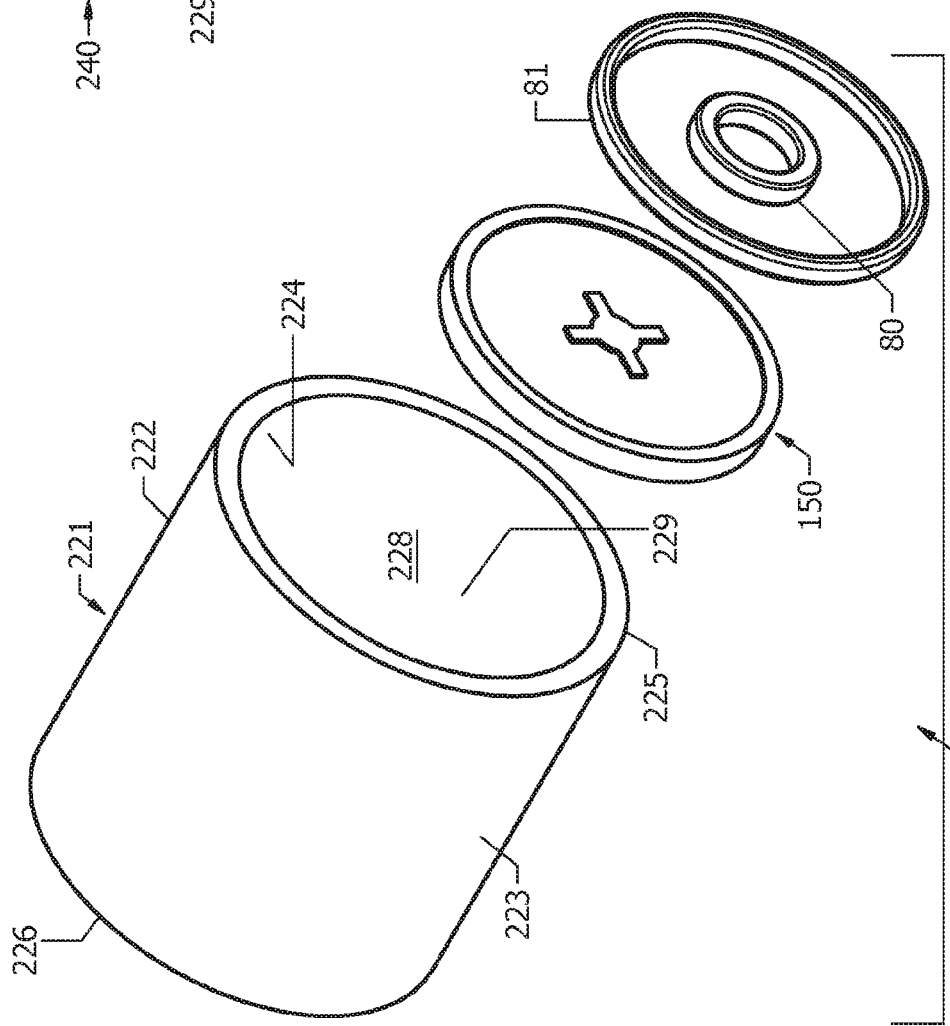
FIG. 43
FIG. 42

COAXIAL CABLE TERMINATOR ASSEMBLY HAVING A SUBSTRATE WITH INNER AND OUTER TERMINATION CONNECTIONS CARRIED BY A CAP

CROSS-REFERENCE TO RELATED APPLICATION

This application claims the benefit of U.S. Provisional Patent Application No. 62/157,201, filed May 5, 2015, the entire contents of which are incorporated herein by reference.

FIELD OF THE INVENTION

The present invention relates to apparatus and methods for terminating coaxial cables, including feed lines and transmission lines.

BACKGROUND OF THE INVENTION

In the telecommunications field it is standard practice to test cables. Common forms of testing include continuity, return loss (RL), time domain reflectometry (TDR), and distance-to-fault (DTF). The testing equipment is connected to only one end of the cable for many of these tests. For RL, TDR, and DTF testing, all of the energy in the test signal is reflected back to the test instrument, in the absence of a suitable termination on the opposite end of the cable. Moreover, cable discontinuities can cause multiple reflections to occur, which can cause the measurement data to be imprecise or harder to interpret in the presence of noise produced by the reflections. Accordingly, the opposite end of the cable must be terminated, with the characteristic or a preselected cable impedance, for the testing to be accurate and consistent. The termination should sufficiently absorb the energy of the test signal to provide accurate and precise measurements. The cable termination typically should provide a return loss of 20 decibels or better.

Current practice requires the installation of connectors on the cable to be tested and a separate termination device attached to one of the connectors. These connectors are expensive and time-consuming to install. As a result, cables are often not tested until installed/connectorized, or until the connectors are temporarily installed. Temporary installation of connectors is time consuming, especially because they are removed after testing. There are also situations in which the far end of the cable is not accessible, such as when wound on a spool, requiring the cable to be unspooled to access the far end of the cable.

SUMMARY OF THE INVENTION

According to the principle of the invention, a coaxial cable terminator assembly includes a cap, a substrate, outer and inner termination connections, and outer and inner contacts. The cap is non-conductive and defines a receiving area adapted to receive an end of a coaxial cable. The substrate is electrically insulative, is carried by the cap in the receiving area, and has the outer and inner termination connections and the electrically resistive connector. The electrically resistive connector electrically connects the outer termination connection to the inner termination connection. The outer and inner contacts electrically are connected to the outer and inner termination connections, respectively. The outer and inner contacts are for electrically contacting coaxial outer and inner conductors, respectively, of the end of the coaxial cable for terminating the end of the coaxial cable, and the cap is for frictionally and non-conductively engaging the coaxial cable, when the end of the coaxial cable is inserted into the receiving area. A pocket is formed in the cap, and the substrate is applied to the pocket. In one embodiment, the electrically resistive connector is an electrically resistive film, the substrate includes an outer surface facing the receiving area, and the outer and inner termination connections and the electrically resistive film are applied to the outer surface of the substrate. In another embodiment, the electrically resistive connector is a printed circuit. The outer and inner termination connections are coaxial. The outer and inner contacts are coaxial.

According to the principle of the invention, a coaxial cable terminator assembly includes a cap, a substrate, outer and inner termination connections, and outer and inner contacts. The cap is non-conductive and includes a continuous sidewall having an outer surface, an inner surface, an upper end, a lower end, and a bottom affixed to the lower end, the bottom cooperates with the inner surface of the continuous sidewall to form a receiving area in the cap, the upper end encircles an opening to the receiving area, and the receiving area is adapted to receive an end of a coaxial cable inserted into the receiving area through the opening. The substrate is electrically insulative, is carried by the bottom of the cap in the receiving area, and has outer and inner termination connections and an electrically resistive connector. The electrically resistive connector electrically connects the outer termination connection to the inner termination connection. The outer and inner contacts are electrically connected to the outer and inner termination connections, respectively. The outer and inner contacts are for electrically contacting coaxial outer and inner conductors, respectively, of the end of the coaxial cable for terminating the end of the coaxial cable, and the inner surface of the cap is for frictionally and non-conductively engaging the coaxial cable, when the end of the coaxial cable is inserted into the receiving area through the opening. A pocket is formed in the bottom of the cap, and the substrate is applied to the pocket. In one embodiment, the electrically resistive connector is an electrically resistive film, the substrate includes an outer surface facing the receiving area and a perimeter edge proximate to the inner surface of the continuous sidewall, the outer termination connection is applied to the outer surface of the substrate proximate to the perimeter edge, the inner termination connection is applied centrally to the outer surface of the substrate, and the electrically resistive film is applied to the outer surface of the substrate between the outer termination connection and the inner termination connection. In another embodiment, the electrically resistive connector is a printed circuit. The outer and inner termination connections are coaxial. The outer and inner contacts are coaxial.

BRIEF DESCRIPTION OF THE DRAWINGS

Referring to the drawings:

FIG. 42 is an exploded isometric view of still another embodiment of a coaxial cable terminator assembly constructed and arranged in accordance with the principle of the invention;

FIG. 43 is a section view the embodiment of FIG. 42 as it would appear assembled.

DETAILED DESCRIPTION

Figure 1:
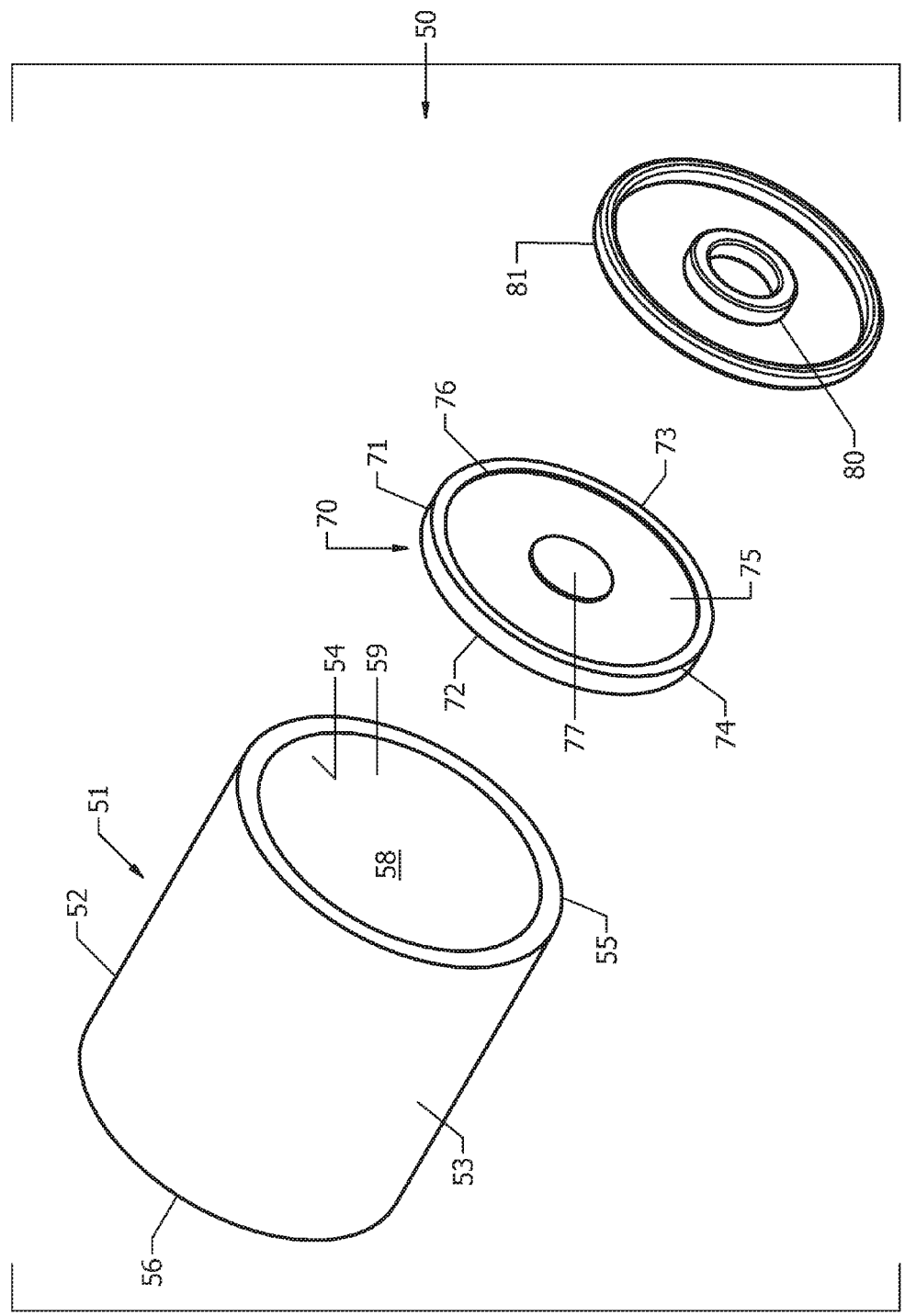
FIG. 1 is an exploded isometric view of a coaxial cable terminator assembly constructed and arranged in accordance with the principle of the invention.

The invention provides illustrative embodiments of terminators or terminator assemblies each useful for terminating the ends of coaxial cables at their characteristic impedances to prevent a test signal, such as a radio frequency signal, from being reflected back from the terminated cable end, causing interference preventing accurate and consistent testing, and methods of terminating coaxial cables at their characteristic impedances. The terminators and termination methods quickly and simply provide cable termination for cable testing purposes and protection of the cable end, all without requiring the installation of a connector or soldering of components to the cable, while providing the performance characteristics required for complete testing. The terminators include a sleeve, shell, or cap that fits over the end of the cable, and a termination assembly or device carried by the cap that electrically connects to the cable inner and outer conductors. The termination assembly or device provides a termination that corresponds to the characteristic impedance of the cable. The termination assembly or device can have any selected impedance characteristic.

The various terminator embodiments of the invention include a sleeve, shell, or cap that fits frictionally over a cable end. The cap can include a compressible area for crimping or staking onto the cable for retention of the cap to the cable. The cap is a mechanical support for the other terminator elements of the terminator, and the cap protects the other terminator elements and the cable end when installed thereon. The cap of the terminator has a termination assembly or device that electrically connects the inner and outer coaxial conductors of the cable for providing continuity to the termination assembly and cable end termination. The termination assembly is broadband in nature, requiring small inductive or capacitive reactance (i.e. being largely resistive in nature). Each of the various terminators disclosed herein simply slip over a coaxial cable and provides a termination and protection to the cable in response.

The terminators and associated cable termination methods disclosed herein are useful by cable manufacturers, distributors, and the like that spool lengths of cable onto reels after first terminating the end of the cable to be buried inside the spool. The buried cable end is generally inaccessible once the cable is spooled. However, by terminating the cable end according to the invention, testing of the cable can be performed at all downstream points in the supply chain. Testing can be performed by the end user upon delivery and acceptance. An installer or end user can test the cable prior to, during, and after installation of the cable.

A temporary termination may be needed when troubleshooting an installed cable. A common problem area is the connectors that are installed on the cable. To determine if a connector or the cable is faulty, a connector can be removed from one end of the cable and such end terminated temporarily according to the invention. Testing can now isolate what is causing the failure.

Those having regard for the art will readily appreciate that the various embodiments of the invention disclosed in detail below conveniently and inexpensively provide for temporary coaxial cable termination for facilitating cable testing. Performance characteristics of the terminators disclosed below are chosen to correspond to the characteristic impedance of the coaxial cable to be tested to allow for detailed testing and analysis with more sophisticated techniques, such as TDR or DTF.

The various illustrative embodiments of the invention will now be discussed in conjunction with FIGS. 1-47, in which like reference characters indicate corresponding elements throughout the several views.

A.

Figure 2:
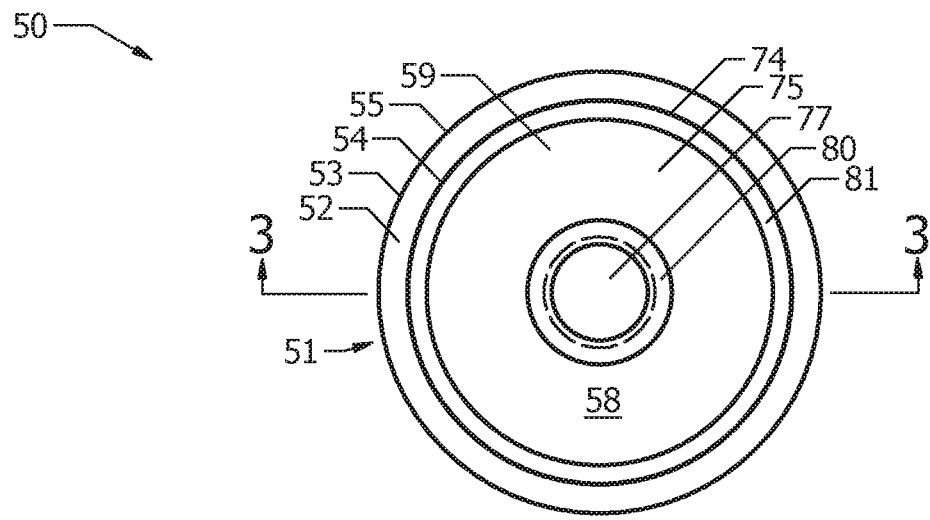
FIG. 2 is a top plan view of the embodiment of FIG. 1 shown assembled.
Figure 3:
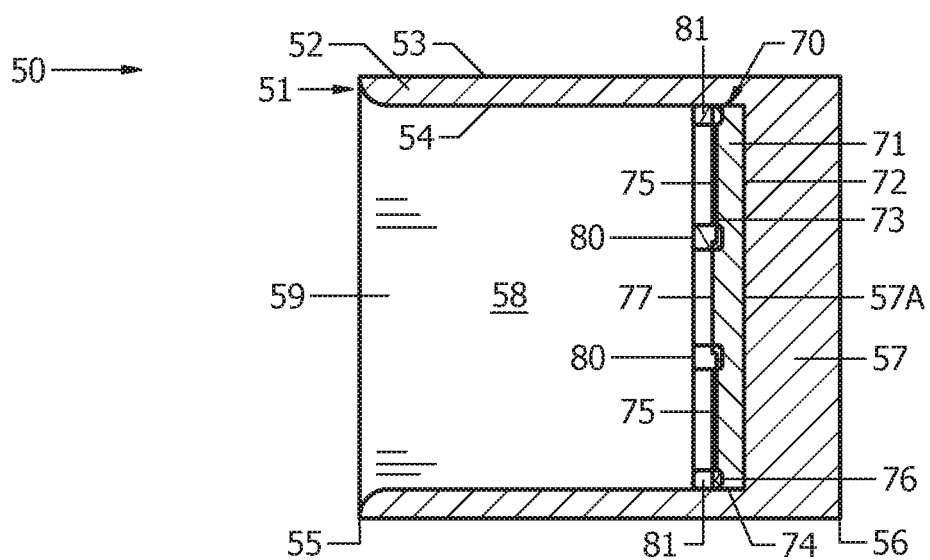
FIG. 3 is a section view taken along line 3-3 of FIG. 2.

FIG. 1 is an exploded isometric view of a coaxial cable terminator 50 constructed and arranged in accordance with the principle of the invention, FIG. 2 is a top plan showing the embodiment of FIG. 1 as it would appear assembled, and FIG. 3 is a section view taken along line 3-3 of FIG. 2. Referring to FIGS. 1-3 in relevant part, terminator 50 is an assembly and includes a cap 51, termination device or assembly 70, inner contact 80, and outer contact 81. Cap 51, formed of plastic, ceramic, or other non-conductive material or combination of materials, includes continuous sidewall 52 having outer surface 53, inner surface 54, upper end 55, lower end 56, and a bottom 57 affixed to lower end 56. In FIG. 3, inner surface 57A of bottom 57 cooperates with inner surface 54 of continuous sidewall 52 to form receiving area 58 in cap 51. Upper end 55 encircles opening 59 to receiving area 58. Cap 51 is formed integrally, is cylindrical in this example, and is symmetrical about its central axis.

Termination assembly 70 includes substrate 71. Substrate 71, which is flat, circular, and disk-shaped in this example, is fashioned of a thermoplastic, polyester, ceramic, or other electrically insulative material or combination of materials. Substrate 71 has lower surface 72, upper surface 73, and perimeter edge 74. An electrically resistive film 75 is applied to upper surface 73. An outer connection 76, an outer termination connection, is applied to upper surface 73 proximate to perimeter edge 74. An inner connection 77, an inner termination connection, is applied to upper surface 73 at the center of substrate 71. Film 75 is a composition of carbon and/or metal in a binder or resin in the presence of a solvent that is applied, such as via printing or spraying, onto upper surface 73 of substrate 71 between outer connection 76 and inner connection 77. Film 75 encounters and concurrently electrical connects outer and inner connections 76 and 77. Film 75 has a preselected resistivity, an intrinsic property of film, and provides specific impedances as needed for the intended application. Common cable impedances are 50 and 70 Ohms. To maintain a 20 decibel return loss or better, film 75 has a low resistivity that not only enables it to inherently readily allow the flow of electric current, but that also corresponds to the cable for which it is intended to be used, preferably an impedance of within 10% of the impedance of the cable. Connections 76 and 77 are each different from film 75. Connections 76 and 77 are each a conductive coating or film, such as a conductive ink in a particular embodiment. Connections 76 and 77 are applied to upper surface 73. Film 75 electrically connects connection 76 to connection 77. Connections 76 and 77 are low resistance connections and provide a low resistance connection to the outer and inner contacts 81 and 80, respectively. As used throughout this disclosure, the terms "low resistance" or "low resistivity" each means a measurement at or below 1.000 ohm.

Inner and outer contacts 80 and 81 each have a low resistance and do not provide a resistive part of the termination assembly. Inner and outer contacts 80 and 81 are annular contacts each formed of metal, metallic braid, a compliant electro-magnetic interference gasket material, conductive elastomer material that is inherently compliant, conductive thermoplastic, a compliant contact in the nature of an electrically conductive mesh applied about foam or other deformable material or combination of materials, or other electrically conductive and low resistive material or combination of materials. Inner and outer contacts 80 and 81 are preferably compliant to promote electrical contact to inner and outer conductors to be tested. Inner contact 80 is applied to and atop inner connection 77, and outer contact 81 is applied to and atop outer connection 76. Inner contact 80 electrically contacts inner connection 77. Outer contact 81 electrically contacts outer connection 76. Film 75 electrically connects inner connection 77 to outer connection 76 thereby electrically connecting inner contact 80 to outer contact 81 for electrically connecting an outer conductor of a cable electrically connected to outer contact 81 to an inner conductor of a cable electrically connected to inner conductor 80. Inner and outer contacts 80 and 81 extend outwardly from film 75 and from upper surface 73 of substrate 71. Inner and outer contacts 80 and 81 are coaxial and are arranged about the geometric center of substrate 71. Outer contact 81, which is located proximate to perimeter edge 74 of substrate 71 and that relates to the outer conductor of a coaxial cable end to be terminated, encircles inner contact 80 that relates to the inner conductor of a coaxial cable end to be terminated. Termination assembly 70 is positioned in receiving area 58 and is installed onto inner surface 57A of bottom 57 in this example. Lower surface 72 of substrate 71 is positioned against inner surface 57A of bottom 57. Lower surface 72 of substrate 71 is affixed to inner surface 57A of bottom 57, such as with a non-conductive adhesive. A friction fit can be used instead in an alternate embodiment. Substrate 71 covers inner surface 57A of bottom 57, outer contact 81 runs along inner surface 54 of continuous sidewall 52 and encircles inner contact 80, and inner and outer contacts 80 and 81 are arranged about the geometric center of cap 51.

Figure 4:
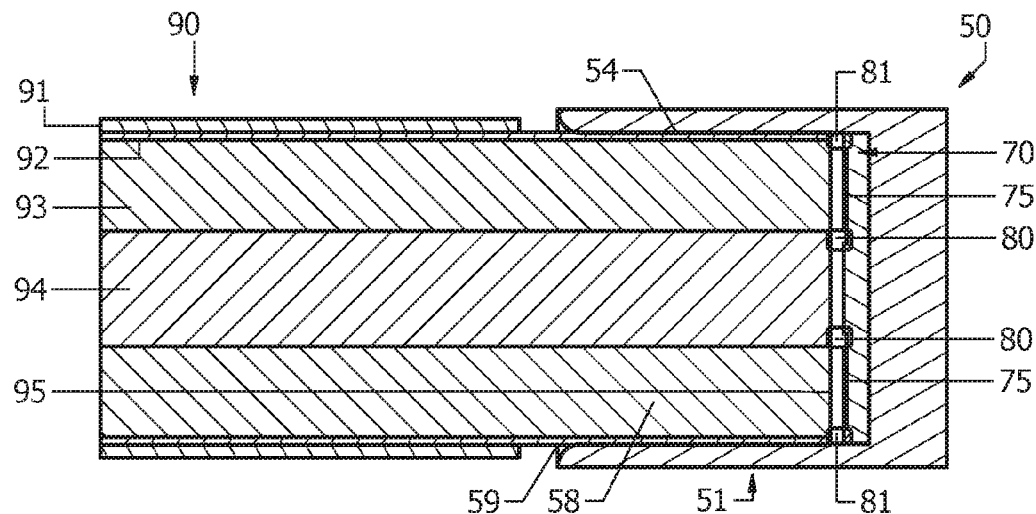
FIGS. 4-7 are section views corresponding to FIG. 3 illustrating different configurations of coaxial cables shown as they would appear terminated with the terminator assembly of FIGS. 1-3.

FIGS. 4-7 are section views corresponding to FIG. 3 illustrating different configurations of coaxial cables shown as they would appear terminated with the terminator 50. In FIG. 4, cable 90, a general coaxial cable, includes outer jacket 91, outer conductor 92, dielectric 93, and inner conductor 94. Outer conductor 92 is a woven braid, a wrapped conductive film, or a smooth-walled metallic tube, such as of aluminum or copper. Inner conductor 94 is either a stranded conductor or a solid conductor. End 95 of cable 90 is stripped of outer jacket 91, exposing outer conductor 92. End 95 is inserted into receiving area 58 through opening 59 in cap 51 of terminator 50. Terminator 50 is pressed onto and over end 95. Concurrently, inner surface 54 frictionally engages outer conductor 92 of cable 90 end 95, outer conductor 92 of cable 90 end 95 electrically contacts outer contact 81, and inner conductor 94 of cable 90 end 95 electrically contacts inner contact 80. Because termination assembly 70 through film 75 electrically and resistively connects inner contact 80 to outer contact 81, the concurrent electrical contact of outer conductor 92 to outer contact 81 and inner conductor 94 to inner contact 80 electrically and resistively connects outer conductor 92 to inner conductor 94, terminating cable 90 end 95.

Figure 5:
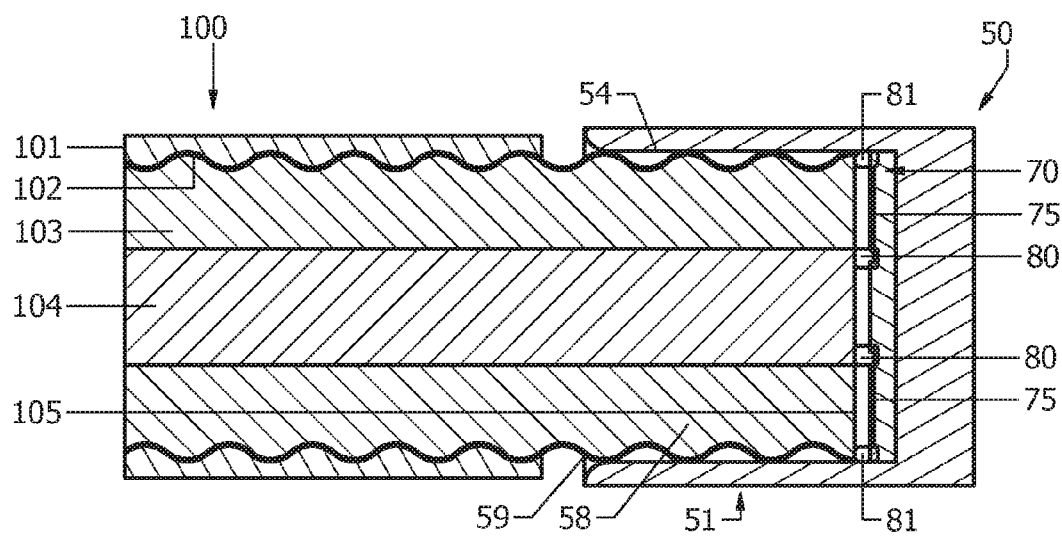

In FIG. 5, cable 100, a coaxial cable useful in a fixed installation, not subject to constant flexing, includes outer jacket 101, outer conductor 102, dielectric 103, and inner conductor 104. In this example, outer conductor 102 is a corrugated metallic tube, such as of copper or aluminum, and inner conductor 104 is a solid metallic conductor, copper plated aluminum in this example. End 105 of cable 100 is stripped of outer jacket 101, exposing outer conductor 102. End 105 is inserted into receiving area 58 through opening 59 in cap 51 of terminator 50. Terminator 50 is pressed onto and over end 105. Concurrently, inner surface 54 frictionally engages outer conductor 102 of cable 100 end 105, outer conductor 102 of cable 100 end 105 electrically contacts outer contact 81, and inner conductor 104 of cable 100 end 105 electrically contacts inner contact 80. Because termination assembly 70 through film 75 electrically and resistively connects inner contact 80 to outer contact 81, the concurrent electrical contact of outer conductor 102 to outer contact 81 and inner conductor 104 to inner contact 80 electrically and resistively connects outer conductor 102 to inner conductor 104, terminating cable 100 end 105.

Figure 6:
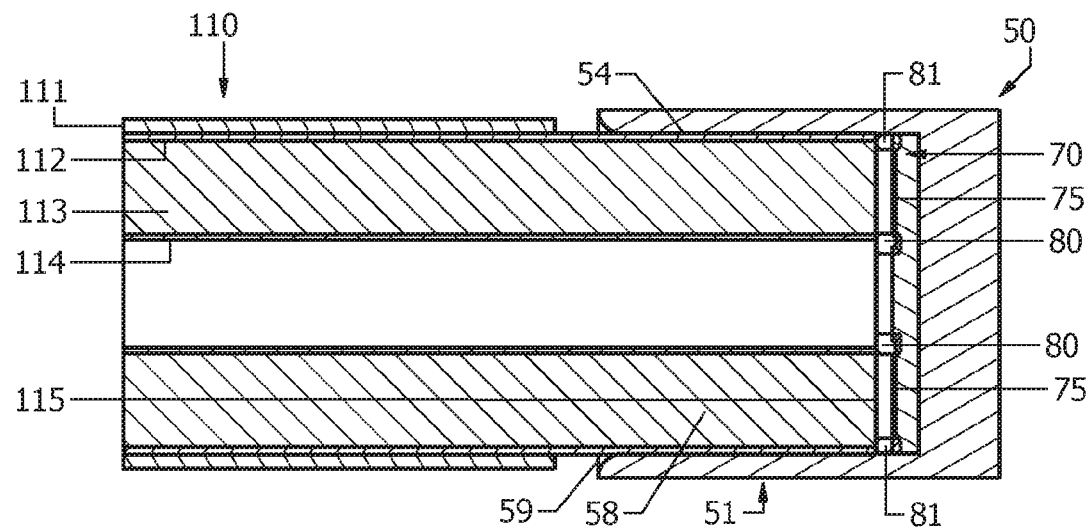

In FIG. 6, cable 110, a coaxial cable useful in a fixed installation, not subject to constant flexing, includes outer jacket 111, outer conductor 112, dielectric 113, and inner conductor 114. Outer conductor 112 can be a woven braid, a wrapped conductive film, or a smooth-walled metallic tube, such as of copper or aluminum. Inner conductor 114 is a hollow metallic tube, such as of copper or aluminum. End 115 of cable 110 is stripped of outer jacket 111, exposing outer conductor 112. End 115 is inserted into receiving area 58 through opening 59 in cap 51 of terminator 50. Terminator 50 is pressed onto and over end 115. Concurrently, inner surface 54 frictionally engages outer conductor 112 of cable 110 end 115, outer conductor 112 of cable 110 end 115 electrically contacts outer contact 81, and inner conductor 114 of cable 110 end 115 encircles and electrically contacts inner contact 80. Because film 75 electrically and resistively connects inner contact 80 to outer contact 81, the concurrent electrical contact of outer conductor 112 to outer contact 81 and inner conductor 114 to inner contact 80 electrically and resistively connects outer conductor 112 to inner conductor 114, terminating cable 110 end 115.

Figure 7:
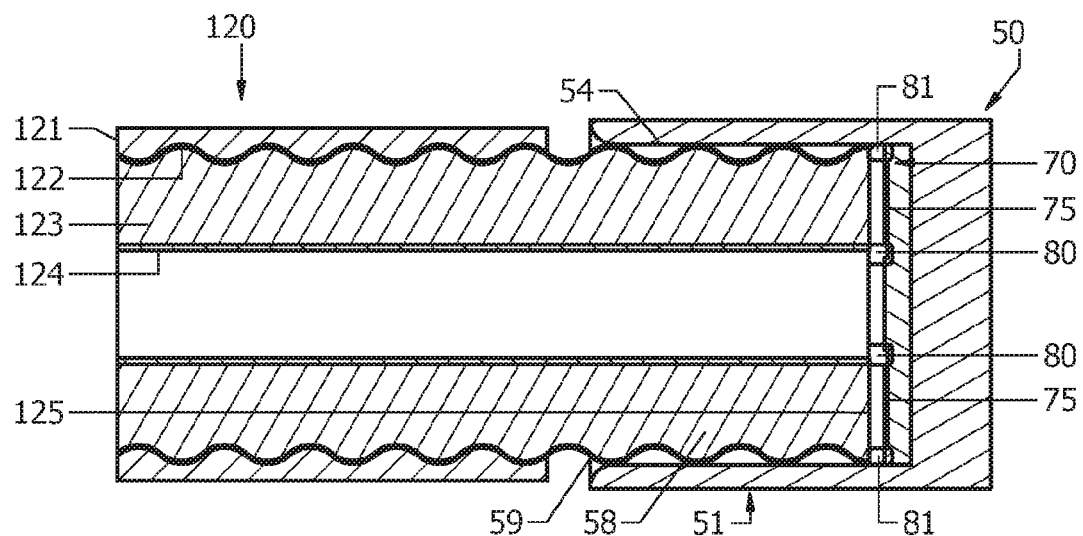

In FIG. 7, cable 120, a coaxial cable useful in a fixed installation, not subject to constant flexing, includes outer jacket 121, outer conductor 112, dielectric 123, and inner conductor 124. In this example, outer conductor 122 is a corrugated metallic tube, such as of aluminum or copper. Inner conductor 124 is a hollow metallic tube, copper or aluminum in this example. End 125 of cable 120 is stripped of outer jacket 121, exposing outer conductor 122. End 125 is inserted into receiving area 58 through opening 59 in cap 51 of terminator 50. Terminator 50 is pressed onto and over end 125. Concurrently, inner surface 54 frictionally engages outer conductor 122 of cable 120 end 125, outer conductor 122 of cable 120 end 125 electrically contacts outer contact 81, and inner conductor 124 of cable 120 end 125 encircles and electrically contacts inner contact 80. Because film 75 electrically and resistively connects inner contact 80 to outer contact 81, the concurrent electrical contact of outer conductor 122 to outer contact 81 and inner conductor 124 to inner contact 80 electrically and resistively connects outer conductor 122 to inner conductor 124, terminating cable 120 end 125.

B.

Figure 8:
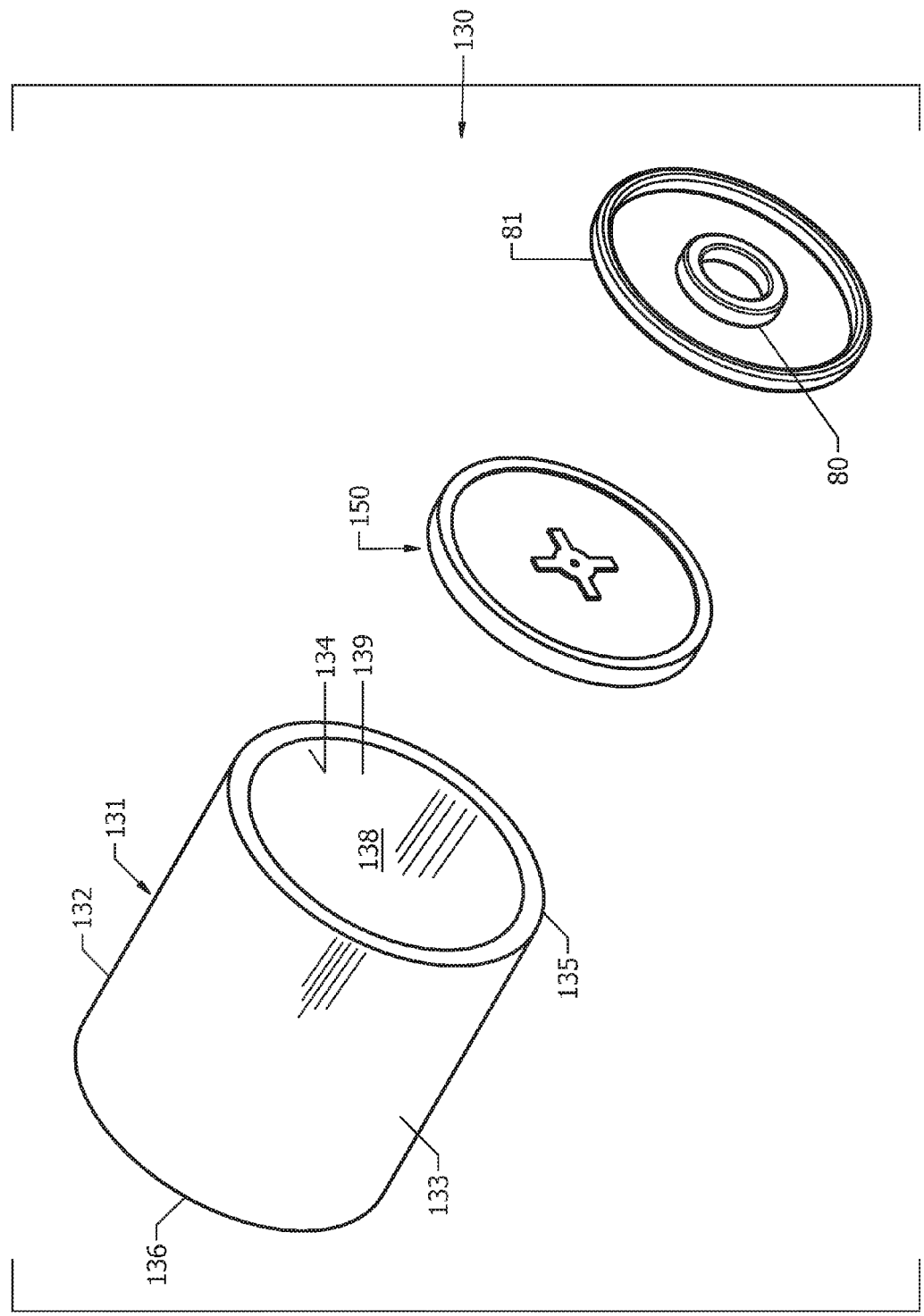
FIG. 8 is an exploded isometric view of another embodiment of a coaxial cable terminator assembly constructed and arranged in accordance with the principle of the invention.
Figure 11:
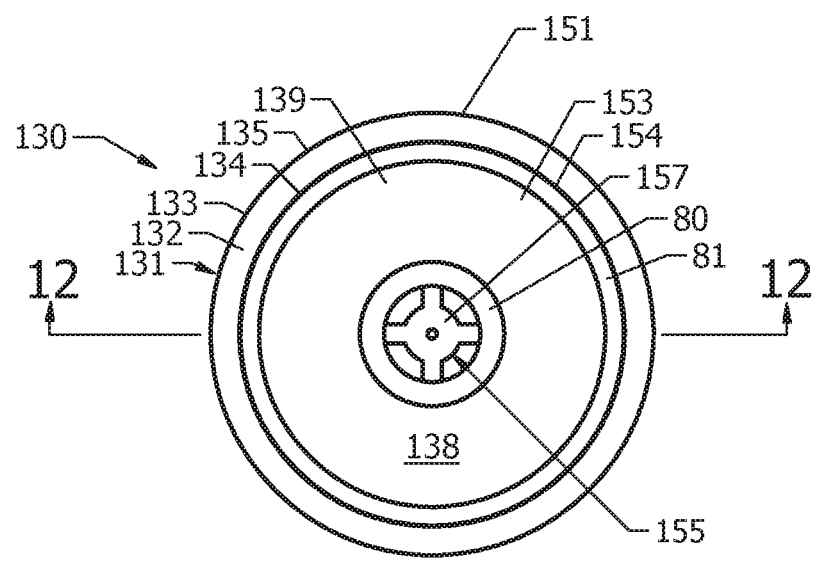
FIG. 11 is a partially schematic top plan view of the embodiment of FIG. 8 shown assembled.
Figure 12:
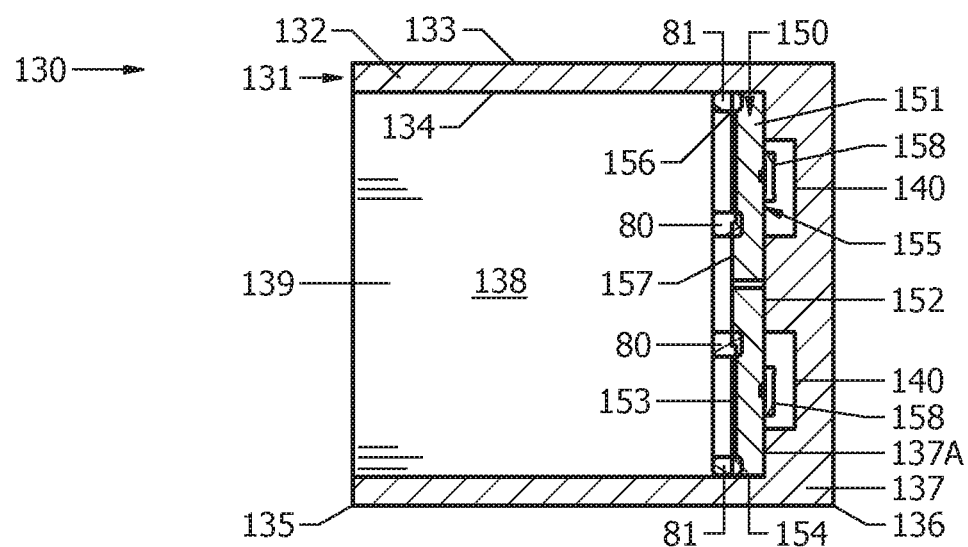
FIG. 12 is a section view taken along line 12-12 of FIG. 11.

FIG. 8 is an exploded isometric view of another embodiment of a coaxial cable terminator 130 constructed and arranged in accordance with the principle of the invention, FIG. 11 is a partially schematic top plan view showing the embodiment of FIG. 8 as it would appear assembled, and FIG. 12 is a section view taken along line 12-12 of FIG. 11. Referring to FIGS. 8, 11, and 12 in relevant part, terminator 130 is an assembly and includes a cap 131, termination device or assembly 150, inner conductor 80, and outer conductor 81. Cap 131, formed of plastic, ceramic, or other non-conductive material or combination of materials, includes continuous sidewall 132 having outer surface 133, inner surface 134, upper end 135, lower end 136, and a bottom 137 affixed to lower end 136. In FIG. 12, inner surface 137A of bottom 137 cooperates with inner surface 134 of continuous sidewall 132 to form receiving area 138 in cap 131. Upper end 135 encircles opening 139 to receiving area 138. Recess 140 in inner surface 137A of bottom 137 is for accommodating resistors of termination assembly 150. Cap 131 is formed integrally, is cylindrical in this example, and is symmetrical about its central axis.

Figure 9:
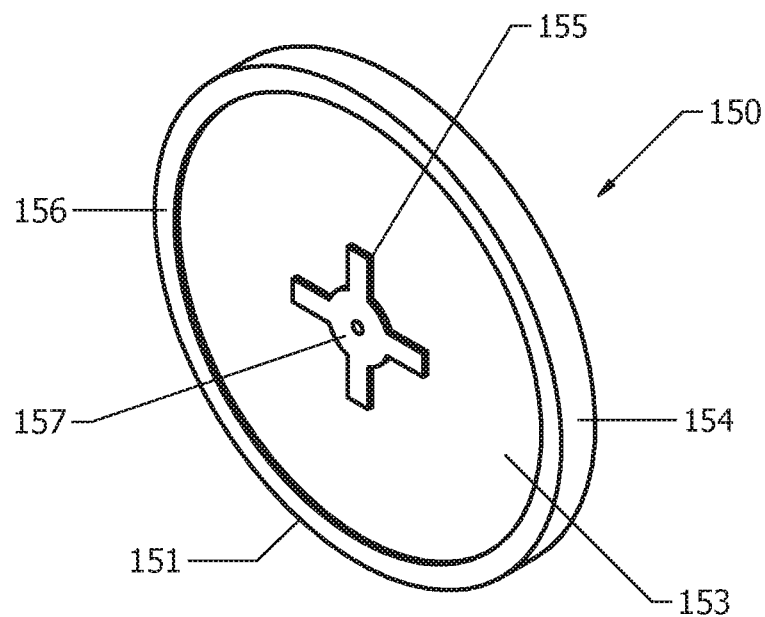
FIG. 9 is a top perspective view of a termination assembly of the terminator assembly of FIG. 8.
Figure 10:
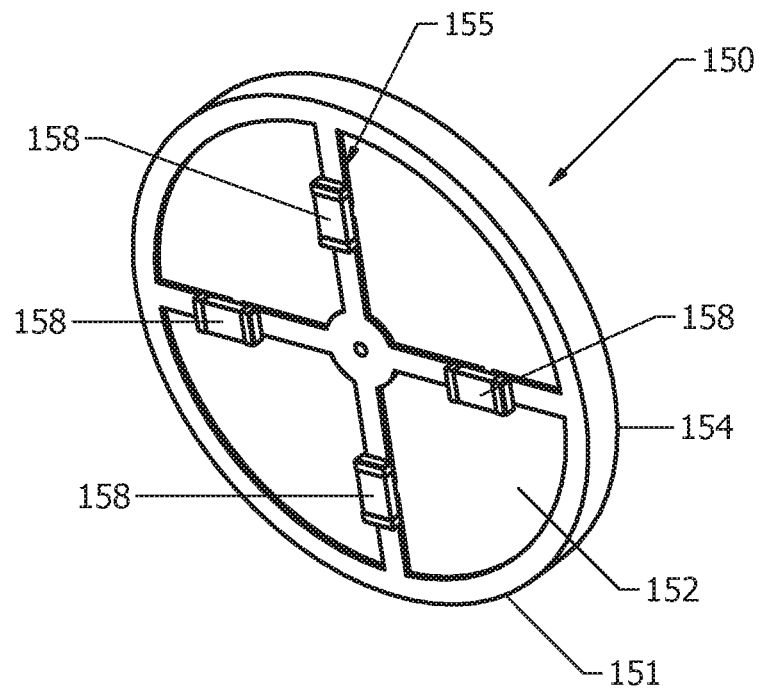
FIG. 10 is a bottom perspective view of the embodiment of FIG. 9.

Termination assembly 150 includes a printed circuit board (PCB), which is electrically connected to inner contact 80 and outer contact 81. Referring to FIGS. 9 and 10 in relevant part, termination assembly 150 includes substrate 151 that carries a printed circuit 155. Substrate 151 is flat, circular, and disk-shaped in this example, is fashioned of an electrically insulative material or combination of materials, such as BoPET (Biaxially-oriented polyethylene terephthalate), a polyester film made from stretched polyethylene terephthalate, which is inherently strong, chemical and dimensional stability, transparency, reflectivity, gas and aroma barrier properties, and electrical insulation. Substrate 151 has lower surface 152, upper surface 153, and perimeter edge 154. Printed circuit 155 includes outer connection 156, inner connection 157, and resistors 158. Outer connection 156, an outer termination connection, is applied to upper surface 153 proximate to perimeter edge 154. Inner connection 157, an inner termination connection, is applied to upper surface 153 at the center of substrate 151. Resistors 158 are applied to lower surface 152 and are electrically connected to inner connector 157 via conductive traces. There are four resistors 158 in this example, and less or more can be used in any series or parallel connected configuration to provide selected impedances as needed for the intended application. Resistors 158 are leaded through-hole components or surface mount device or "chip" resistors. Outer and inner connections 156 and 157 are conductive traces of the printed circuit 155 that provide a low resistance electrical connection to outer and inner contacts 81 and 80, respectively.

Inner contact 80 is applied to and atop inner connection 157, and outer contact 81 is applied to and atop outer connection 156. Inner contact 80 electrically contacts inner connection 157, and outer contact 81 electrically contacts outer connection 156. Printed circuit 155 electrically connects inner connection 157 to outer connection 156 through resistors 158 thereby electrically connecting inner contact 80 to outer contact 81. Inner and outer contacts 80 and 81 extend outwardly from upper surface 153 of substrate 151. Inner and outer contacts 80 and 81 are coaxial and are arranged about the geometric center of substrate 151. Outer contact 81, which is located proximate to perimeter edge 154 of substrate 151 and that relates to the outer conductor of a coaxial cable end to be terminated, encircles inner contact 80 that relates to the inner conductor of a coaxial cable end to be terminated.

Termination assembly 150 is positioned in receiving area 138 and is installed onto inner surface 137A of bottom 137. Lower surface 152 of SUBSTRATE 151 is positioned against inner surface 137A of bottom 137, and resistors 158 are located in recess 140. Lower surface 152 of SUBSTRATE 151 is affixed to inner surface 137A of bottom 137, such as with a non-conductive adhesive. A friction fit can be used in an alternate embodiment. SUBSTRATE 151 covers inner surface 137A of bottom 137, outer contact 81 runs along inner surface 134 of continuous sidewall 132 and encircles inner contact 80, and inner and outer contacts 80 and 81 are arranged about the geometric center of cap 131.

Figure 13:
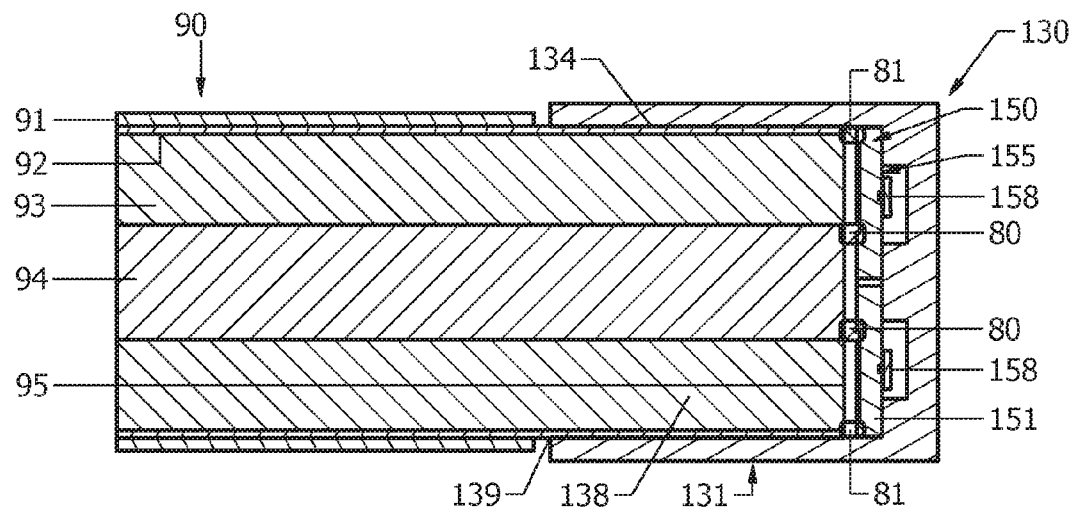
FIGS. 13-16 are section views corresponding to FIG. 12 illustrating different configurations of coaxial cables shown as they would appear terminated with the terminator assembly of FIGS. 8 and 12.

FIGS. 13-16 are section views corresponding to FIG. 12 illustrating different configurations of coaxial cables shown as they would appear terminated with the terminator 130. In FIG. 13, cable 90 includes outer jacket 91, outer conductor 92, dielectric 93, and inner conductor 94. End 95 of cable 90 is stripped of outer jacket 91, exposing outer conductor 92. End 95 is inserted into receiving area 138 through opening 139 in cap 131. Cap 131 is pressed onto and over end 95. Concurrently, inner surface 134 frictionally engages outer conductor 92 of cable 90 end 95, outer conductor 92 of cable 90 end 95 electrically contacts outer contact 81, and inner conductor 94 of cable 90 end 95 electrically contacts inner contact 80. Because printed circuit 155 electrically and resistively connects inner contact 80 to outer contact 81 via resistors 158, the concurrent electrical contact of outer conductor 92 to outer contact 81 and inner conductor 94 to inner contact 80 electrically and resistively connects outer conductor 92 to inner conductor 94, terminating cable 90 end 95 with termination assembly 150.

Figure 14:
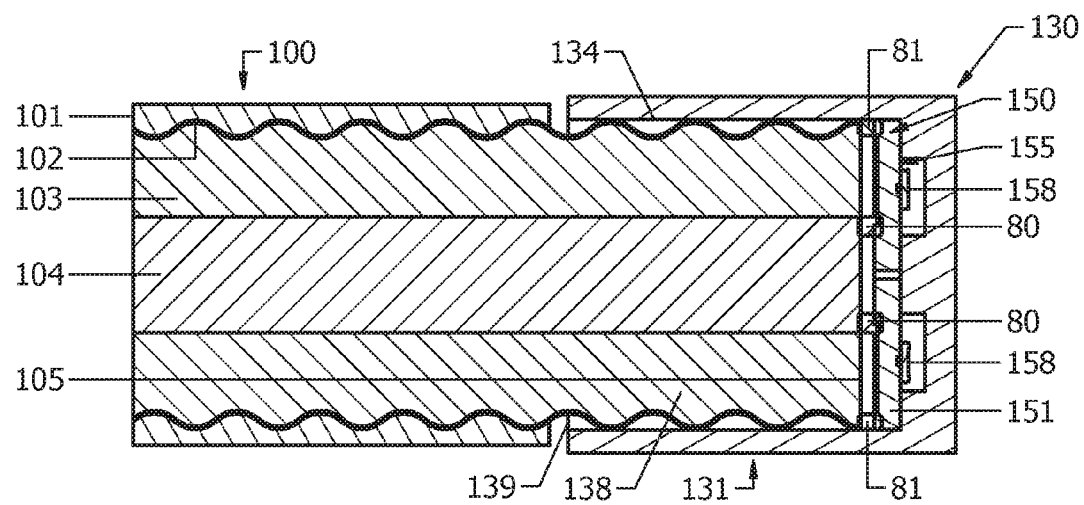

In FIG. 14, cable 100 includes outer jacket 101, outer conductor 102, dielectric 103, and inner conductor 104. End 105 of cable 100 is stripped of outer jacket 101, exposing outer conductor 102. End 105 is inserted into receiving area 138 through opening 139 in cap 131. Cap 131 is pressed onto and over end 105. Concurrently, inner surface 134 frictionally engages outer conductor 102 of cable 100 end 105, outer conductor 102 of cable 100 end 105 electrically contacts outer contact 81, and inner conductor 104 of cable 100 end 105 electrically contacts inner contact 80. Because printed circuit 155 electrically and resistively connects inner contact 80 to outer contact 81 via resistors 158, the concurrent electrical contact of outer conductor 102 to outer contact 81 and inner conductor 104 to inner contact 80 electrically and resistively connects outer conductor 102 to inner conductor 104, terminating cable 100 end 105 with termination assembly 150.

Figure 15:
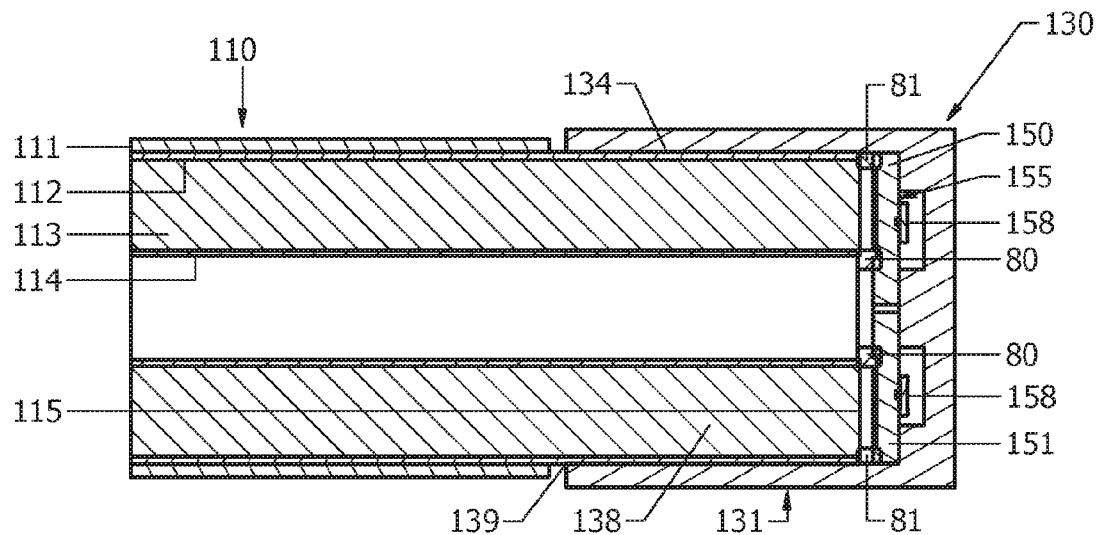

In FIG. 15, cable 110 includes outer jacket 111, outer conductor 112, dielectric 113, and inner conductor 114. End 115 of cable 110 is stripped of outer jacket 111, exposing outer conductor 112. End 115 is inserted into receiving area 138 through opening 139 in cap 131. Cap 131 is pressed onto and over end 115. Concurrently, inner surface 134 frictionally engages outer conductor 112 of cable 110 end 115, outer conductor 112 of cable 110 end 115 electrically contacts outer contact 81, and inner conductor 114 of cable 110 end 115 encircles and electrically contacts inner contact 80. Because printed circuit 155 electrically and resistively connects inner contact 80 to outer contact 81 via resistors 158, the concurrent electrical contact of outer conductor 112 to outer contact 81 and inner conductor 114 to inner contact 80 electrically and resistively connects outer conductor 112 to inner conductor 114, terminating cable 110 end 115 with termination assembly 150.

Figure 16:
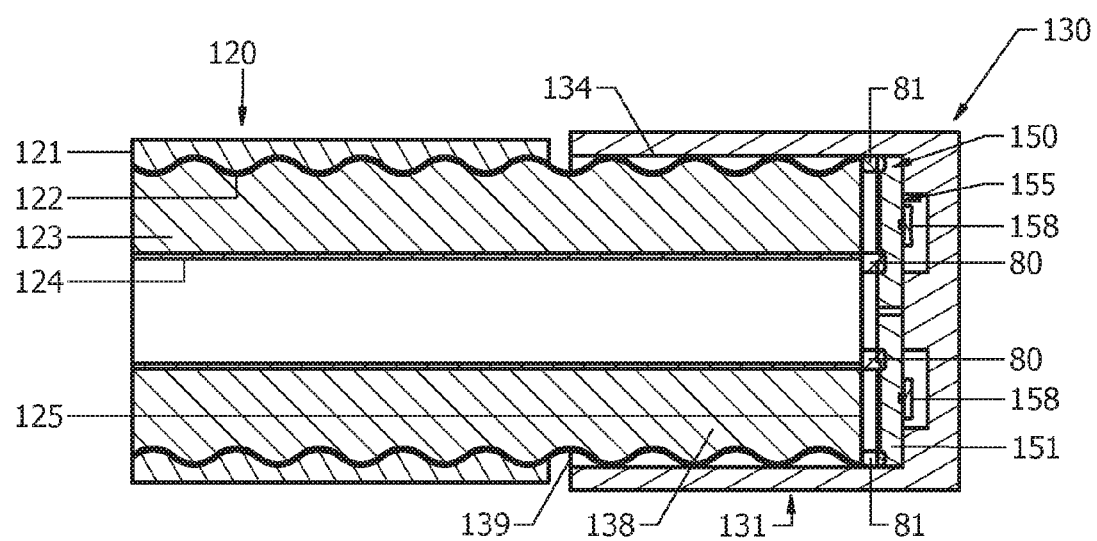

In FIG. 16, cable 120 includes outer jacket 121, outer conductor 122, dielectric 123, and inner conductor 124. End 125 of cable 120 is stripped of outer jacket 121, exposing outer conductor 122. End 125 is inserted into receiving area 138 through opening 139 in cap 131. Cap 131 is pressed onto and over end 125. Concurrently, inner surface 134 frictionally engages outer conductor 122 of cable 120 end 125, outer conductor 122 of cable 120 end 125 electrically contacts outer contact 81, and inner conductor 124 of cable 120 end 125 encircles and electrically contacts inner contact 80. Because printed circuit 155 electrically and resistively connects inner contact 80 to outer contact 81 via resistors 158, the concurrent electrical contact of outer conductor 122 to outer contact 81 and inner conductor 124 to inner contact 80 electrically and resistively connects outer conductor 122 to inner conductor 124, terminating cable 120 end 125 with termination assembly 150.

C.

Figure 17:
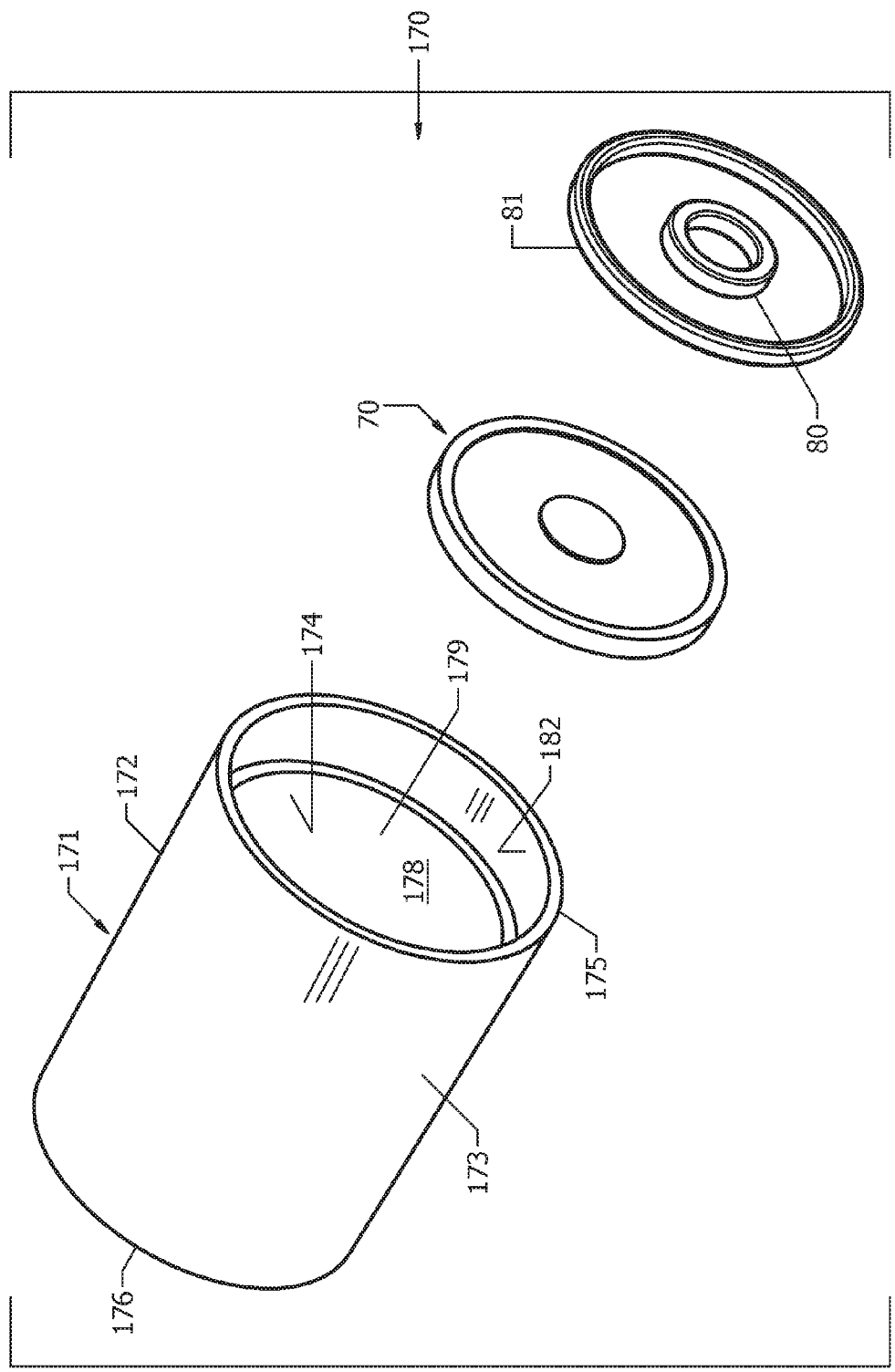
FIG. 17 is an exploded isometric view of a further embodiment of a coaxial cable terminator assembly constructed and arranged in accordance with the principle of the invention.
Figure 18:
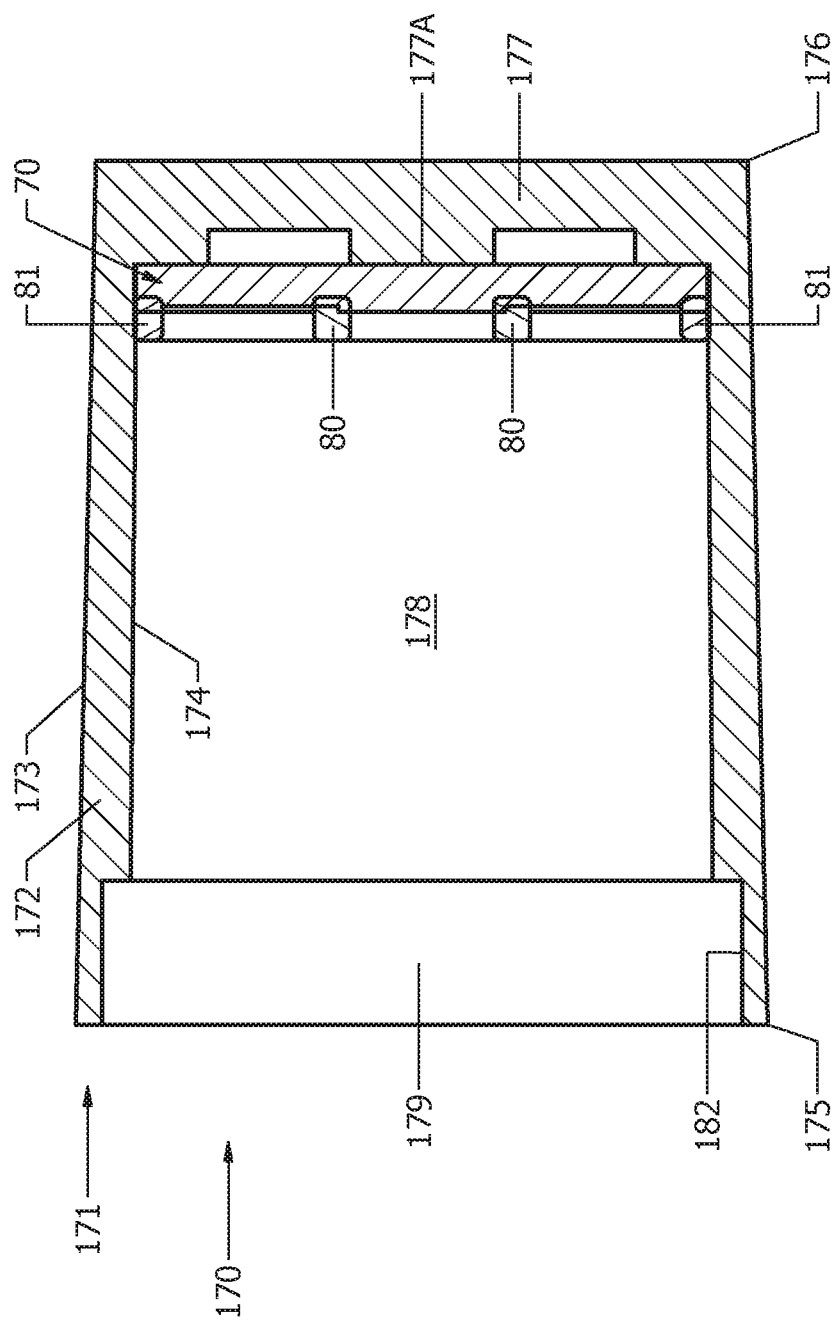
FIG. 18 is a section view the embodiment of FIG. 17 as it would appear assembled.

FIG. 17 is an exploded isometric view of a further embodiment of a coaxial cable terminator 170 constructed and arranged in accordance with the principle of the invention, and FIG. 18 is a section view of the embodiment of FIG. 17 shown as it would appear assembled. Referring to FIGS. 17 and 18 in relevant part, terminator 170 is an assembly and includes cap 171, termination assembly 70, inner contact 80, and outer contact 81. Cap 171, formed of plastic, ceramic, or other non-conductive material or combination of materials, includes continuous sidewall 172 having outer surface 173, inner surface 174, upper end 175, lower end 176, and a bottom 177 affixed to lower end 176. In FIG. 18, inner surface 177A of bottom 177 cooperates with inner surface 174 of continuous sidewall 172 to form receiving area 178 in cap 171. Upper end 175 encircles opening 179 to receiving area 178. Counter bore 182 is formed in inner surface 174 at upper end 175. In FIG. 18, recess 184 in inner surface 177A of bottom 177 is for accommodating resistors of a PCB termination assembly, such as termination assembly 150 discussed above. Termination assembly 70 is positioned in receiving area 178 and is installed onto inner surface 177A of bottom 177 as discussed above in terminator 50. Cap 171 is formed integrally, is cylindrical in this example, and is symmetrical about its central axis.

Figure 19:
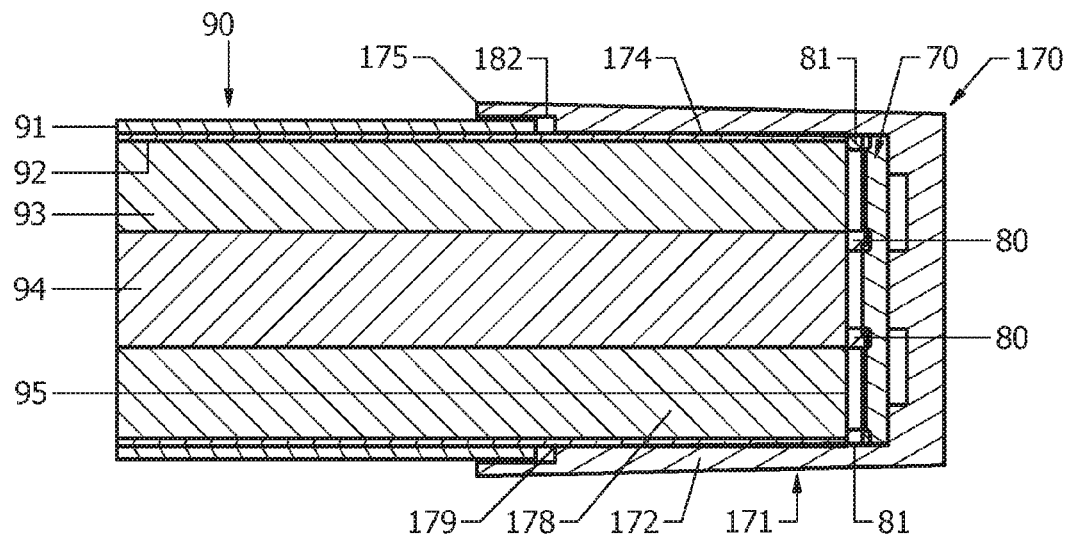
FIGS. 19-22 are section views corresponding to FIG. 18 illustrating different configurations of coaxial cables shown as they would appear terminated with the terminator assembly of FIGS. 17 and 18.

FIGS. 19-22 are section views corresponding to FIG. 18 illustrating different configurations of coaxial cables shown as they would appear terminated with the terminator 170. In FIG. 19, cable 90 includes outer jacket 91, outer conductor 92, dielectric 93, and inner conductor 94. End 95 of cable 90 is stripped of outer jacket 91, exposing outer conductor 92. End 95 is inserted into receiving area 178 through opening 179 in cap 171. Cap 171 is pressed onto and over end 95. Concurrently, an unstripped portion of cable 90 is received in counter bore 182 sealing upper end 175 of continuous sidewall 172 around the outer jacket 91, inner surface 174 frictionally engages outer conductor 92 of cable 90 end 95, outer conductor 92 of cable 90 end 95 electrically contacts outer contact 81, and inner conductor 94 of cable 90 end 95 electrically contacts inner contact 80 terminating cable 90 end 95 with termination assembly 70. In FIG. 19, cap 171 encloses end 95 so as to protect end 95 from environmental influences.

Figure 20:
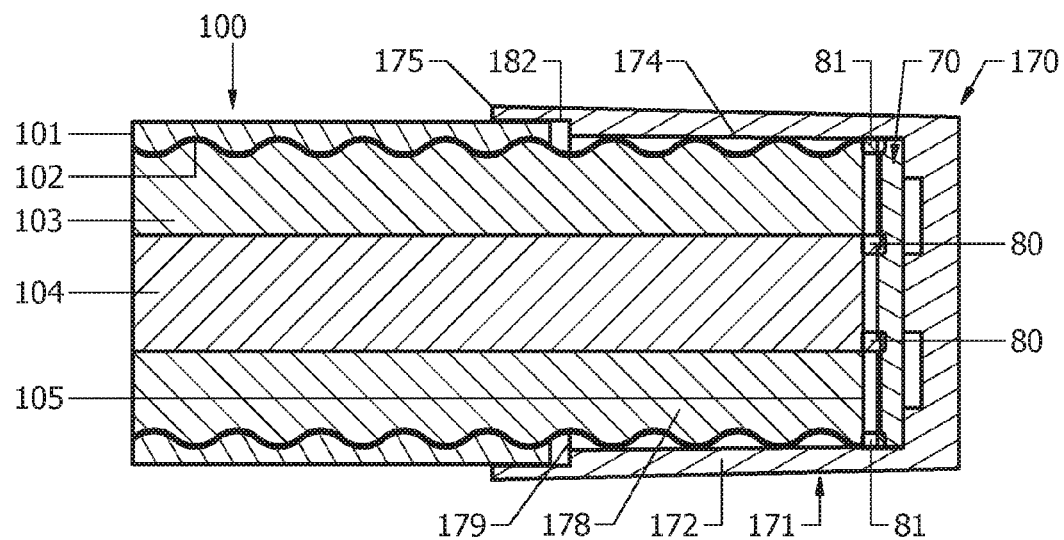

In FIG. 20, cable 100 includes outer jacket 101, outer conductor 102, dielectric 103, and inner conductor 104. End 105 of cable 100 is stripped of outer jacket 101, exposing outer conductor 102. End 105 is inserted into receiving area 178 through opening 179 in cap 171. Cap 171 is pressed onto and over end 105. Concurrently, an unstripped portion of cable 100 is received in counter bore 182 sealing upper end 175 of continuous sidewall 172 around the outer jacket 101, inner surface 174 frictionally engages outer conductor 102 of cable 100 end 105, outer conductor 102 of cable 100 end 105 electrically contacts outer contact 81, and inner conductor 104 of cable 100 end 105 electrically contacts inner contact 80, terminating cable 100 end 105 with termination assembly 70. In FIG. 20, cap 171 encloses end 105 so as to protect end 105 from environmental influences.

Figure 21:
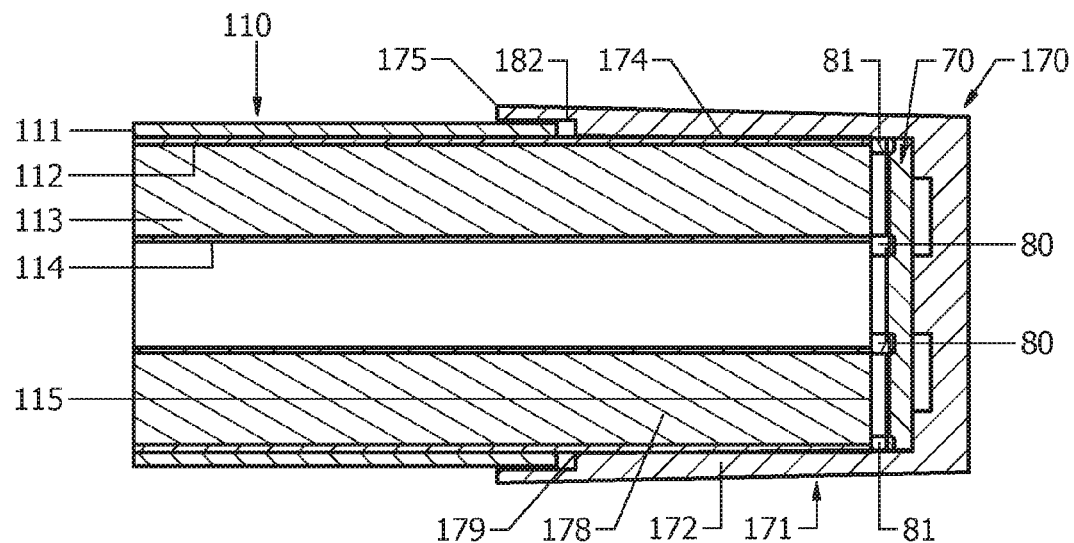

In FIG. 21, cable 110 includes outer jacket 111, outer conductor 112, dielectric 113, and inner conductor 114. End 115 of cable 110 is stripped of outer jacket 111, exposing outer conductor 112. End 115 is inserted into receiving area 178 through opening 179 in cap 171. Cap 171 is pressed onto and over end 115. Concurrently, an unstripped portion of cable 110 is received in counter bore 182 sealing upper end 175 of continuous sidewall 172 around the outer jacket 111, inner surface 174 frictionally engages outer conductor 112 of cable 110 end 115, outer conductor 112 of cable 110 end 115 electrically contacts outer contact 81, and inner conductor 114 of cable 110 end 115 encircles and electrically contacts inner contact 80, terminating cable 110 end 115 with termination assembly 70. In FIG. 21, cap 171 encloses end 115 so as to protect end 115 from environmental influences.

Figure 22:
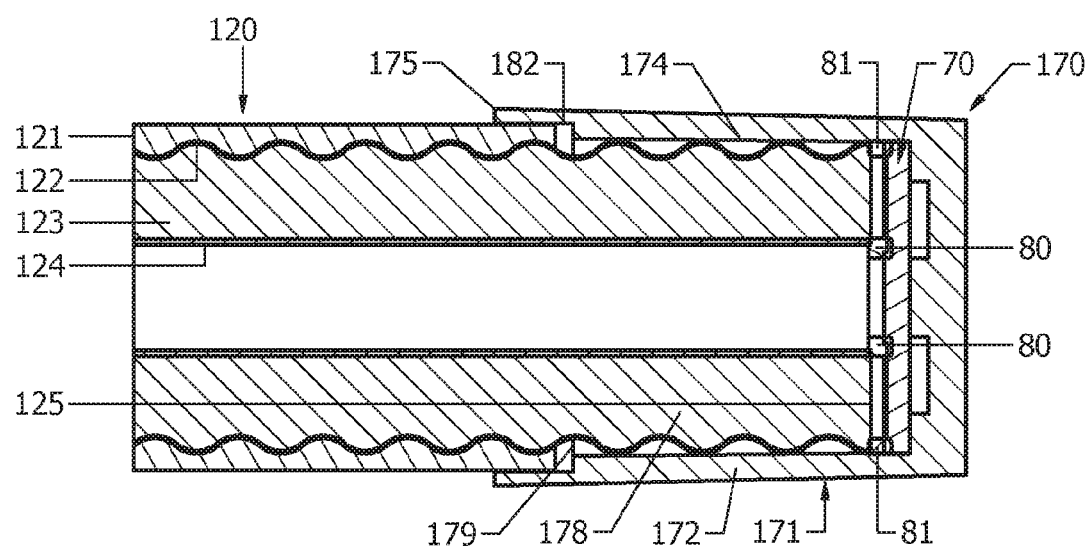

In FIG. 22, cable 120 includes outer jacket 121, outer conductor 122, dielectric 123, and inner conductor 124. End 125 of cable 120 is stripped of outer jacket 121, exposing outer conductor 122. End 125 is inserted into receiving area 178 through opening 179 in cap 171. Cap 171 is pressed onto and over end 125. Concurrently, an unstripped portion of cable 120 is received in counter bore 182 sealing upper end 175 of continuous sidewall 172 around the outer jacket 121, inner surface 174 frictionally engages outer conductor 122 of cable 120 end 125, outer conductor 122 of cable 120 end 125 electrically contacts outer contact 81, and inner conductor 124 of cable 120 end 125 encircles and electrically contacts inner contact 80, terminating cable 120 end 125 with termination assembly 70. In FIG. 22, cap 171 encloses end 125 so as to protect end 125 from environmental influences.

D.

Figure 23:
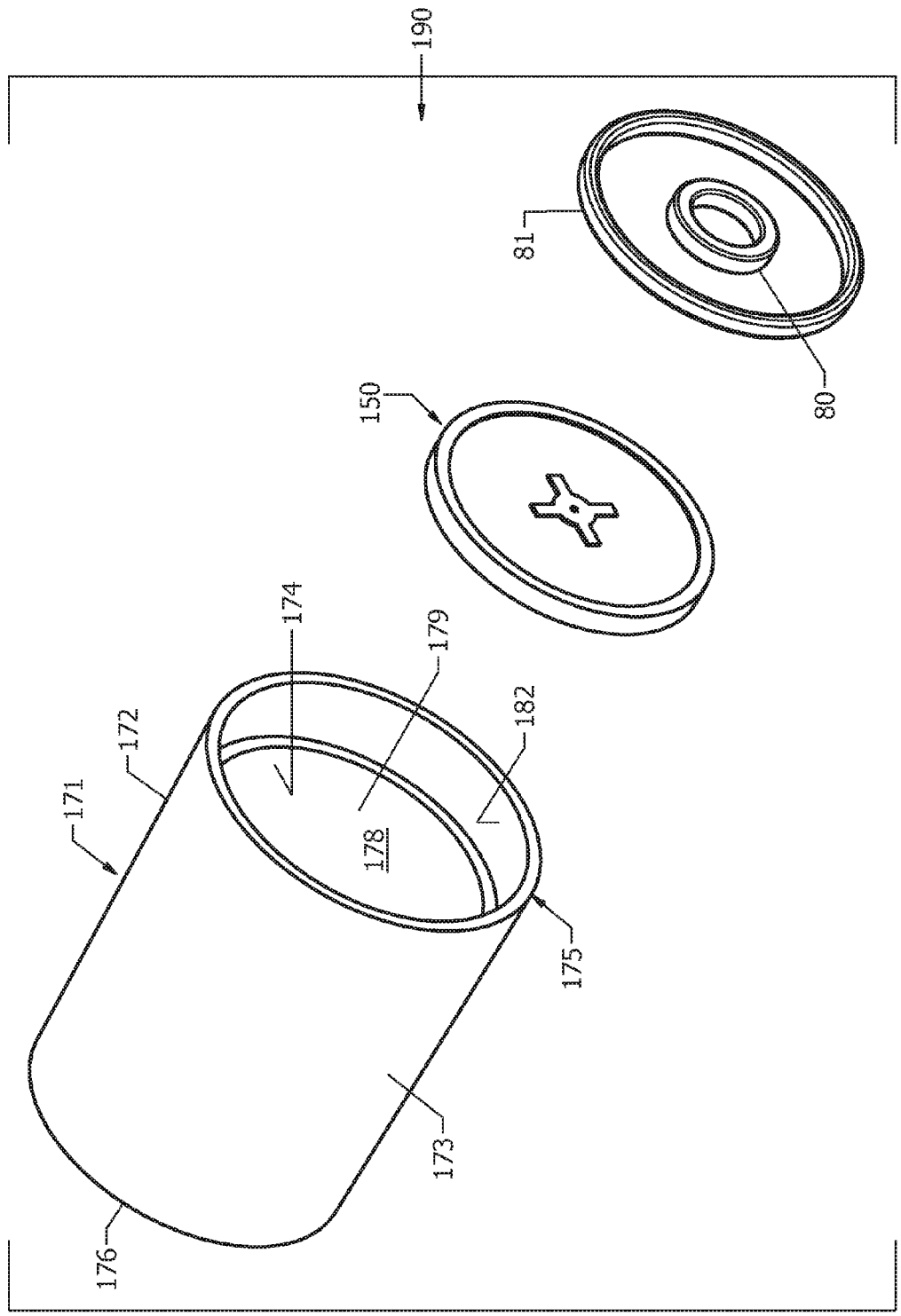
FIG. 23 is an exploded isometric view of still another embodiment of a coaxial cable terminator assembly constructed and arranged in accordance with the principle of the invention.
Figure 24:
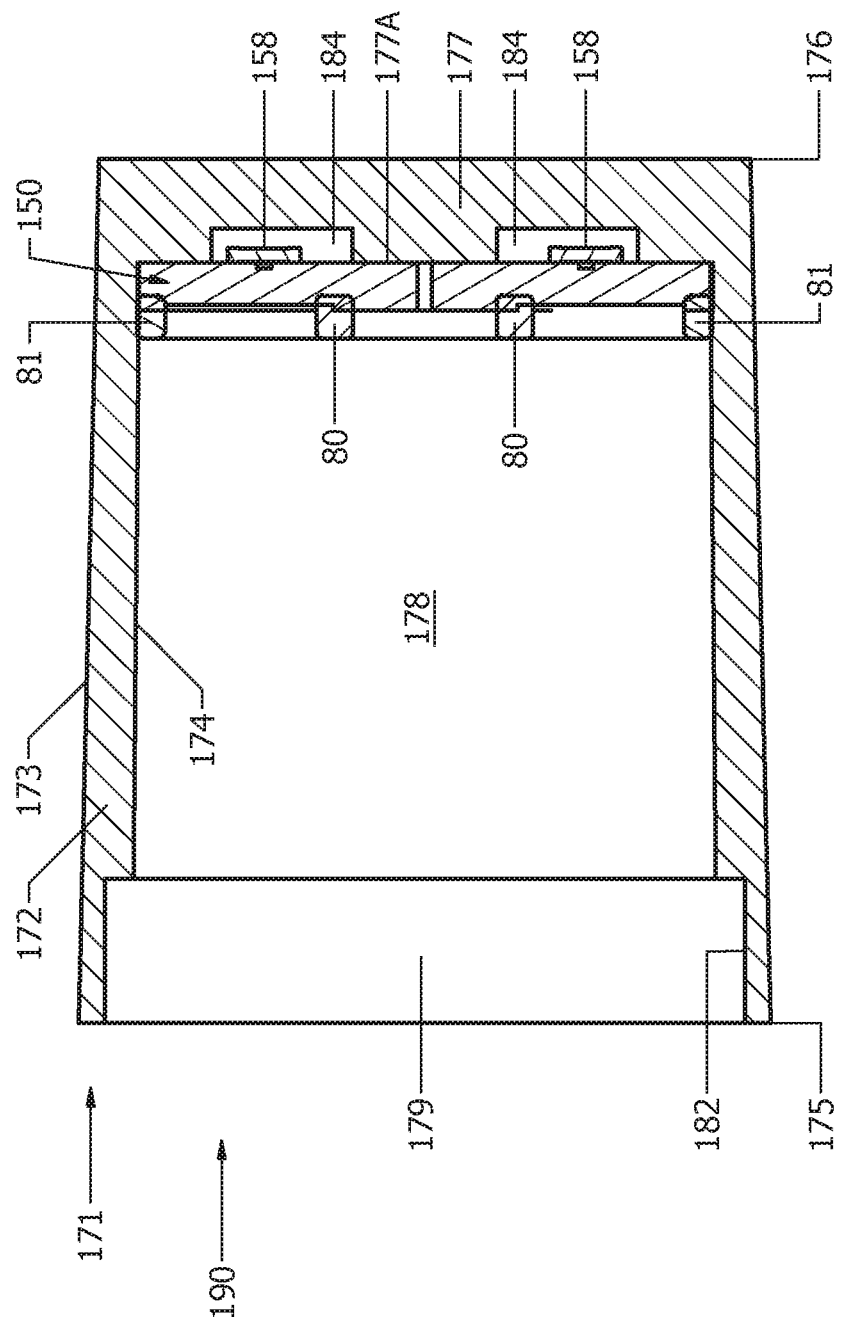
FIG. 24 is a section view the embodiment of FIG. 23 as it would appear assembled.

FIG. 23 is an exploded isometric view of a further embodiment of a coaxial cable terminator 190 constructed and arranged in accordance with the principle of the invention, and FIG. 24 is a section view of the embodiment of FIG. 23 shown as it would appear assembled. Terminator 190 is an assembly and includes cap 171 discussed above, termination assembly 150 discussed above, and inner and outer contacts 80 and 81. Cap 171 has continuous sidewall 172, outer surface 173, inner surface 174, upper end 175, lower end 176, bottom 177, inner surface 177A, receiving area 178, opening 179, counter bore 182, and recess 184 in inner surface 177A of bottom 177 for accommodating resistors of a PCB termination assembly, such as termination assembly 150 discussed above. Termination assembly 150 is positioned in receiving area 178 and is installed onto inner surface 177A of bottom 177 as discussed above in terminator 130. Resistors 158 are located in recess 184.

Figure 25:
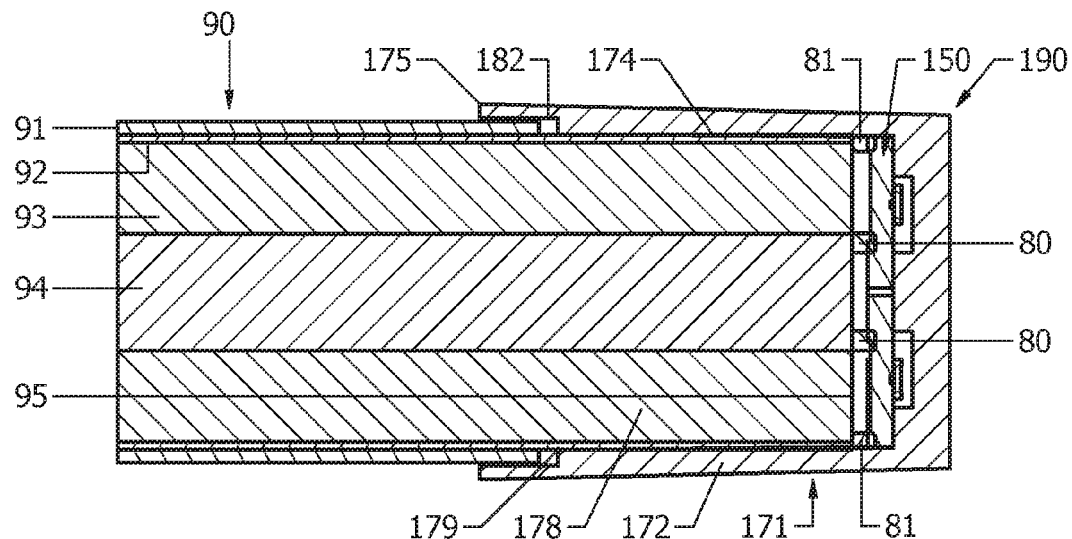
FIGS. 25-28 are section views corresponding to FIG. 24 illustrating different configurations of coaxial cables shown as they would appear terminated with the terminator assembly of FIGS. 23 and 24.

FIGS. 25-28 are section views corresponding to FIG. 24 illustrating different configurations of coaxial cables shown as they would appear terminated with the terminator 190. In FIG. 25, cable 90 includes outer jacket 91, outer conductor 92, dielectric 93, and inner conductor 94. End 95 of cable 90 is stripped of outer jacket 91, exposing outer conductor 92. End 95 is inserted into receiving area 178 through opening 179 in cap 171. Cap 171 is pressed onto and over end 95. Concurrently, an unstripped portion of cable 90 is received in counter bore 182 sealing upper end 175 of continuous sidewall 172 around the outer jacket 91, inner surface 174 frictionally engages outer conductor 92 of cable 90 end 95, outer conductor 92 of cable 90 end 95 electrically contacts outer contact 81, and inner conductor 94 of cable 90 end 95 electrically contacts inner contact 80 terminating cable 90 end 95 with termination assembly 150. In FIG. 25, cap 171 encloses end 95 so as to protect end 95 from environmental influences.

Figure 26:
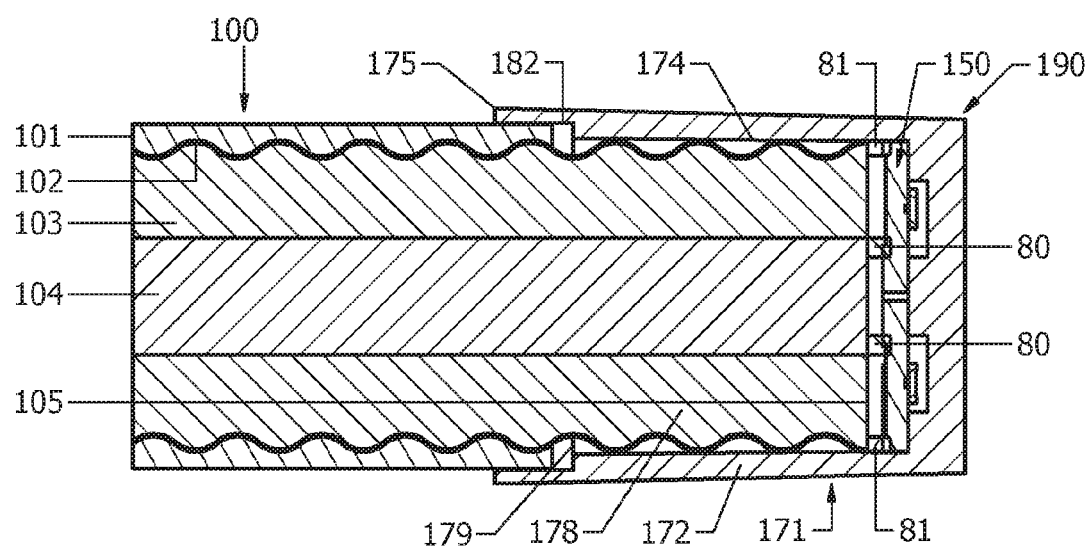

In FIG. 26, cable 100 includes outer jacket 101, outer conductor 102, dielectric 103, and inner conductor 104. End 105 of cable 100 is stripped of outer jacket 101, exposing outer conductor 102. End 105 is inserted into receiving area 178 through opening 179 in cap 171. Cap 171 is pressed onto and over end 105. Concurrently, an unstripped portion of cable 100 is received in counter bore 182 sealing upper end 175 of continuous sidewall 172 around the outer jacket 101, inner surface 174 frictionally engages outer conductor 102 of cable 100 end 105, outer conductor 102 of cable 100 end 105 electrically contacts outer contact 81, and inner conductor 104 of cable 100 end 105 electrically contacts inner contact 80, terminating cable 100 end 105 with termination assembly 150. In FIG. 26, cap 171 encloses end 105 so as to protect end 105 from environmental influences.

Figure 27:
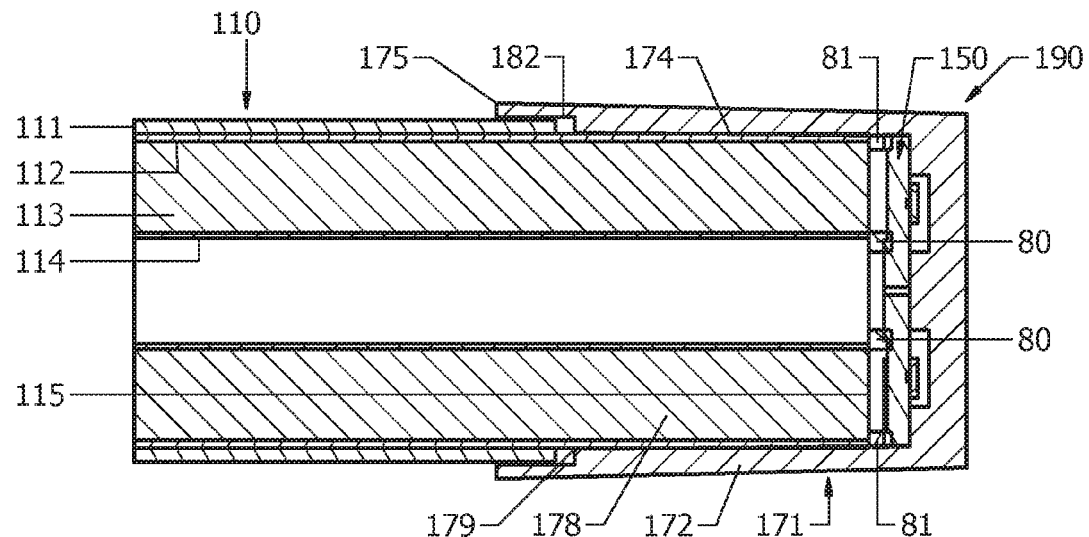

In FIG. 27, cable 110 includes outer jacket 111, outer conductor 112, dielectric 113, and inner conductor 114. End 115 of cable 110 is stripped of outer jacket 111, exposing outer conductor 112. End 115 is inserted into receiving area 178 through opening 179 in cap 171. Cap 171 is pressed onto and over end 115. Concurrently, an unstripped portion of cable 110 is received in counter bore 182 sealing upper end 175 of continuous sidewall 172 around the outer jacket 111, inner surface 174 frictionally engages outer conductor 112 of cable 110 end 115, outer conductor 112 of cable 110 end 115 electrically contacts outer contact 81, and inner conductor 114 of cable 110 end 115 encircles and electrically contacts inner contact 80, terminating cable 110 end 115 with termination assembly 150. In FIG. 27, cap 171 encloses end 115 so as to protect end 115 from environmental influences.

Figure 28:
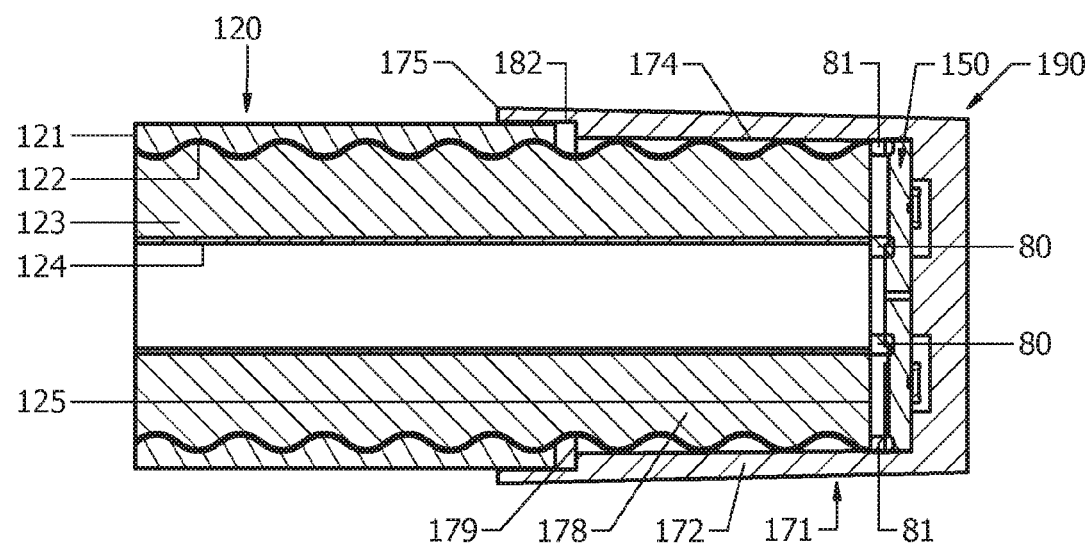

In FIG. 28, cable 120 includes outer jacket 121, outer conductor 122, dielectric 123, and inner conductor 124. End 125 of cable 120 is stripped of outer jacket 121, exposing outer conductor 122. End 125 is inserted into receiving area 178 through opening 179 in cap 171. Cap 171 is pressed onto and over end 125. Concurrently, an unstripped portion of cable 120 is received in counter bore 182 sealing upper end 175 of continuous sidewall 172 around the outer jacket 121, inner surface 174 frictionally engages outer conductor 122 of cable 120 end 125, outer conductor 122 of cable 120 end 125 electrically contacts outer contact 81, and inner conductor 124 of cable 120 end 125 encircles and electrically contacts inner contact 80, terminating cable 120 end 125 with termination assembly 150. In FIG. 28, cap 171 encloses end 125 so as to protect end 125 from environmental influences.

E.

Figure 29:
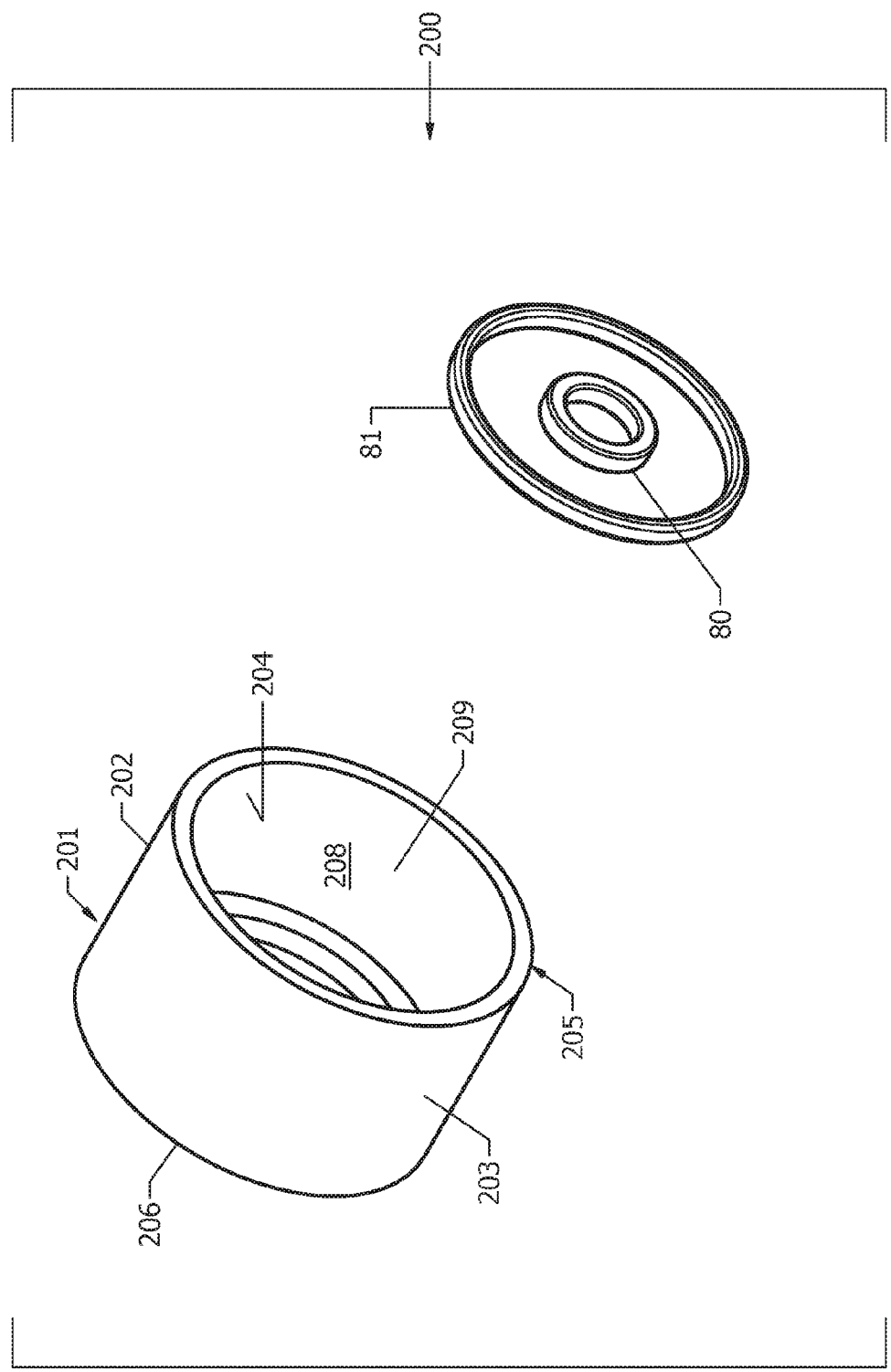
FIG. 29 is an exploded isometric view of yet another embodiment of a coaxial cable terminator assembly constructed and arranged in accordance with the principle of the invention.
Figure 30:
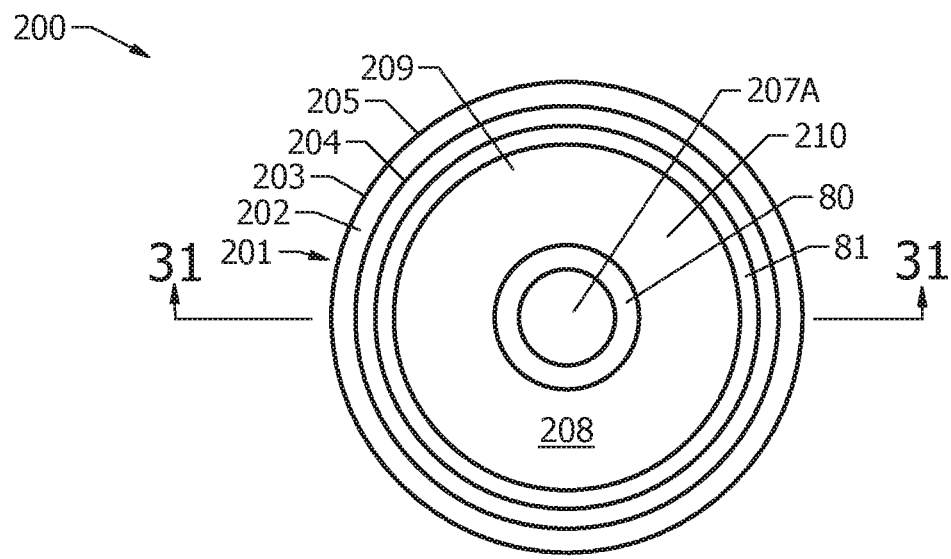
FIG. 30 is a top plan view of the embodiment of FIG. 29 shown assembled.
Figure 31:
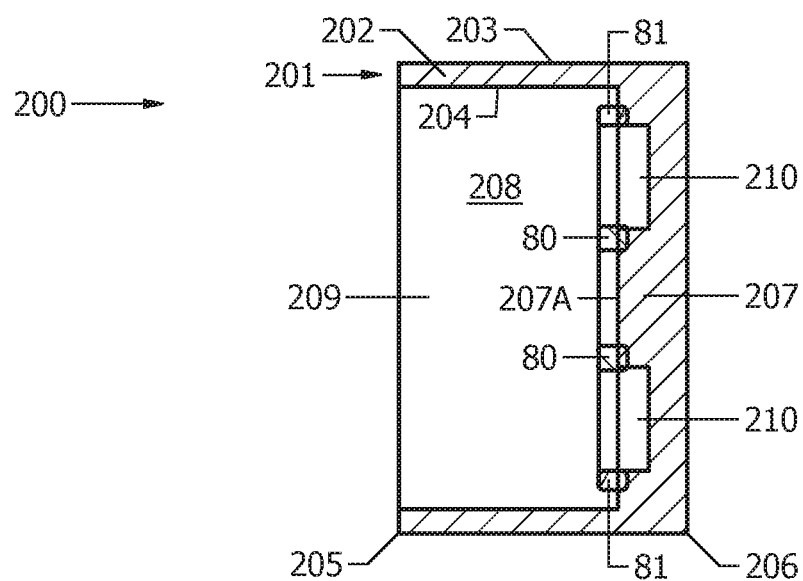
FIG. 31 is a section view taken along line 31-31 of FIG. 30.

FIG. 29 is an exploded isometric view of a yet another embodiment of a coaxial cable terminator 200 constructed and arranged in accordance with the principle of the invention, FIG. 30 is a top plan view showing the embodiment of FIG. 29 as it would appear assembled, and FIG. 31 is a section view taken along line 31-31 of FIG. 30. Referring to FIGS. 29-31 in relevant part, terminator 200 is an assembly and includes cap 201, inner contact 80, and outer contact 81. Cap 201, formed of an electrically conductive and resistive plastic or other like or similar material or combination of materials, includes continuous sidewall 202 having outer surface 203, inner surface 204, upper end 205, lower end 206, and a bottom 207 affixed to lower end 206. In FIG. 31, inner surface 207A of bottom 207 cooperates with inner surface 204 of continuous sidewall 202 to form receiving area 208 in cap 201. Upper end 205 encircles opening 209 to receiving area 208. In FIG. 31, the size of recess 210 in inner service 207A of bottom 207, specifically the width and depth of recess 210, is chosen to set the resistivity between inner contact 80 and outer contact 81. The size of recess 210 can be adjusted to adjust the desired resistivity between inner contact 80 and outer contact 81. Inner and outer contacts 80 and 81 are located in receiving area and are installed onto inner surface 207A of bottom 207, such as with a conductive adhesive. Outer contact 81 runs in juxtaposition along inner surface 204 of continuous sidewall 202 and encircles inner contact 80, and inner and outer contacts 80 and 81 are arranged about the geometric center of cap 201. Inner and outer contacts 80 and 81 electrically contact inner surface 207A of bottom 207 of cap 201. The inherent electrically conductive and resistive characteristics of the substance of cap 201 material cause cap 201 to electrically and resistively connect inner contact 80 to outer contact 81. Cap 201 is the termination device of terminator 200. Cap 201 is formed integrally, is cylindrical in this example, and is symmetrical about its central axis.

Figure 32:
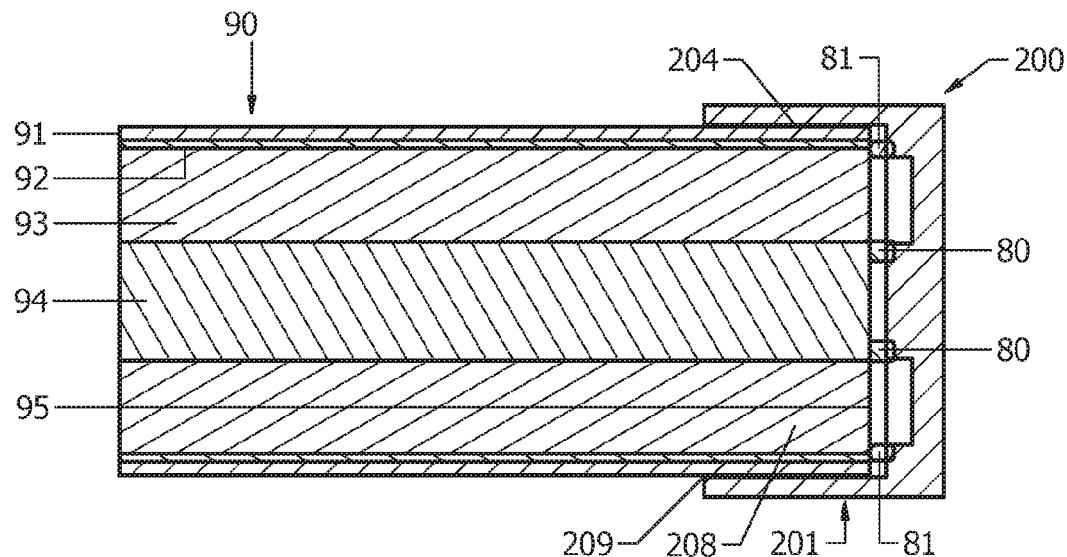
FIGS. 32-35 are section views corresponding to FIG. 31 illustrating different configurations of coaxial cables shown as they would appear terminated with the terminator assembly of FIGS. 29-31.

FIGS. 32-35 are section views corresponding to FIG. 29 illustrating different configurations of coaxial cables shown as they would appear terminated with the terminator 200. In FIG. 32, cable 90 includes outer jacket 91, outer conductor 92, dielectric 93, and inner conductor 94. End 95 of cable 90 is not stripped of outer jacket 91. End 95 is inserted into receiving area 208 through opening 209 in cap 201. Cap 201 is pressed onto and over end 95. Concurrently, inner surface 204 frictionally engages outer jacket 91 of cable 90 end 95, outer conductor 92 of cable 90 end 95 electrically contacts outer contact 81, and inner conductor 94 of cable 90 end 95 electrically contacts inner contact 80. The electrically conductive and resistive quality of the substance of cap 201 material electrically and resistively connects inner contact to outer contact 81 thereby electrically and resistively connecting outer conductor 92 to inner conductor 94, terminating cable 90 end 95.

Figure 33:
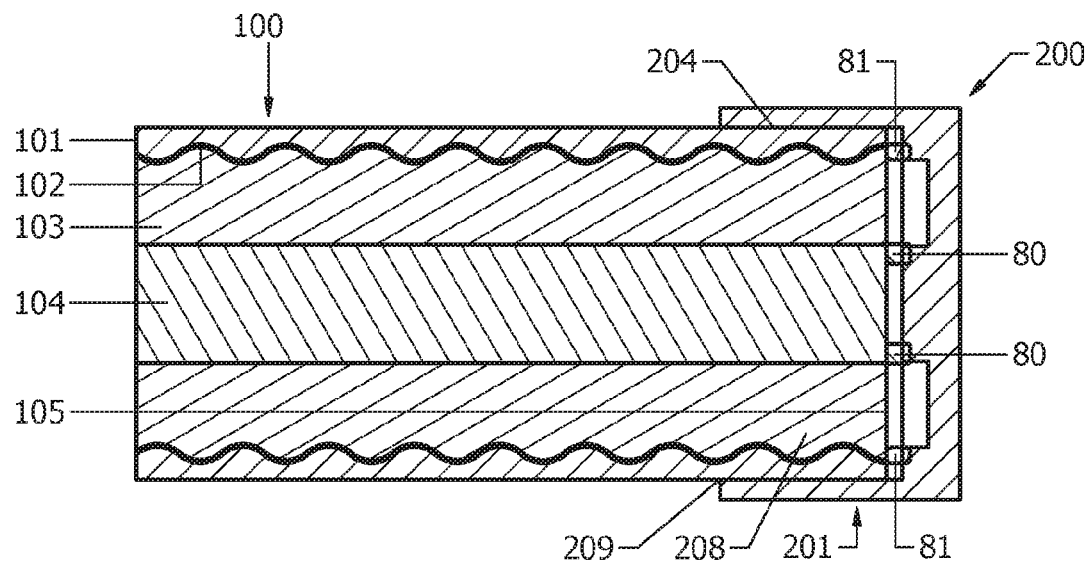

In FIG. 33, cable 100 includes outer jacket 101, outer conductor 102, dielectric 103, and inner conductor 104. End 105 of cable 100 is not stripped of outer jacket 101. End 105 is inserted into receiving area 208 through opening 209 in cap 201. Cap 201 is pressed onto and over end 105. Concurrently, inner surface 204 frictionally engages outer jacket 101 of cable 100 end 105, outer conductor 102 of cable 100 end 105 electrically contacts outer contact 81, and inner conductor 104 of cable 100 end 105 electrically contacts inner contact 80, terminating cable 100 end 105.

Figure 34:
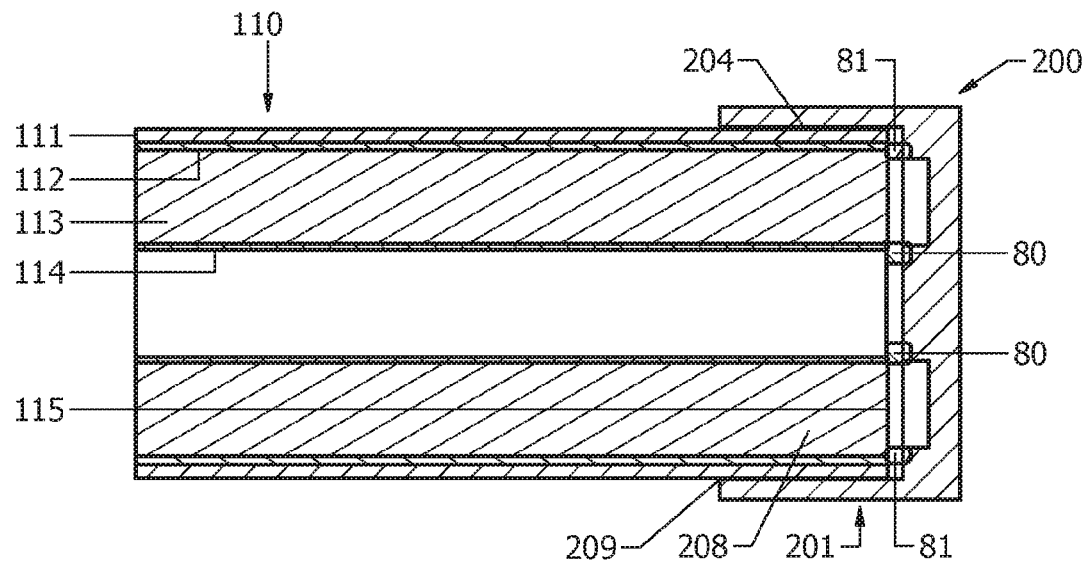

In FIG. 34, cable 110 includes outer jacket 111, outer conductor 112, dielectric 113, and inner conductor 114. End 115 of cable 110 is not stripped of outer jacket 111. End 115 is inserted into receiving area 208 through opening 209 in cap 201. Cap 201 is pressed onto and over end 115. Concurrently, inner surface 204 frictionally engages outer jacket 111 of cable 110 end 115, outer conductor 112 of cable 110 end 115 electrically contacts outer contact 81, and inner conductor 114 of cable 110 end 115 encircles and electrically contacts inner contact 80, terminating cable 110 end 115.

Figure 35:
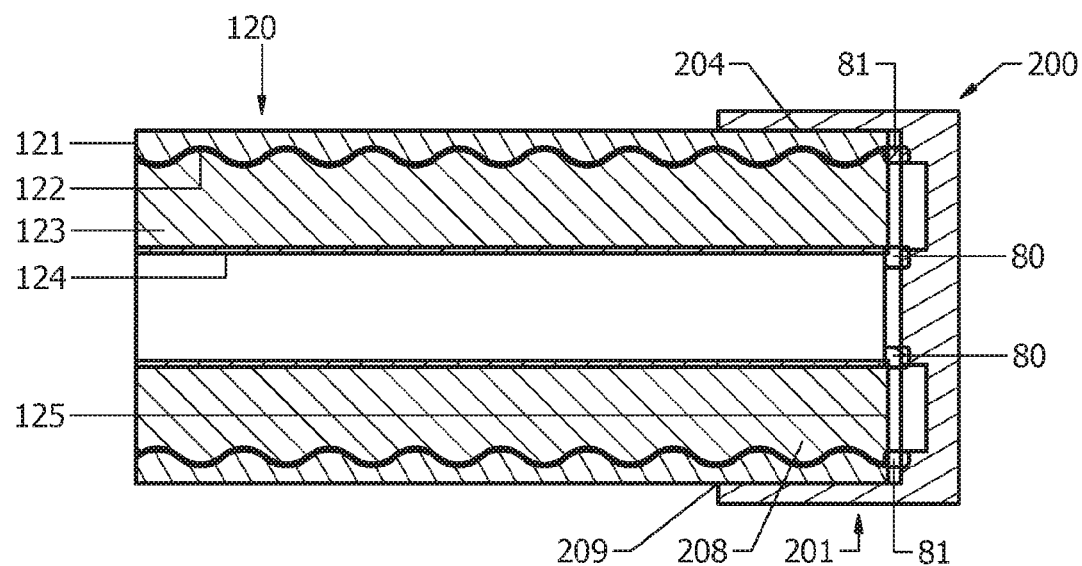

In FIG. 35, cable 120 includes outer jacket 121, outer conductor 122, dielectric 123, and inner conductor 124. End 125 of cable 120 is not stripped of outer jacket 121. End 125 is inserted into receiving area 208 through opening 209 in cap 201. Cap 201 is pressed onto and over end 125. Concurrently, inner surface 204 frictionally engages outer jacket 121 of cable 120 end 125, outer conductor 122 of cable 120 end 125 electrically contacts outer contact 81, and inner conductor 124 of cable 120 end 125 encircles and electrically contacts inner contact 80, terminating cable 120 end 125.

F.

Figure 37:
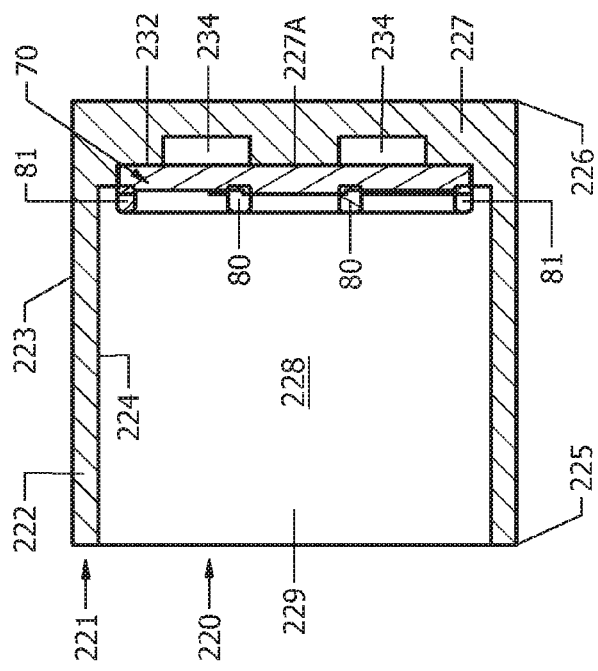
FIG. 37 is a section view the embodiment of FIG. 36 as it would appear assembled.
Figure 36:
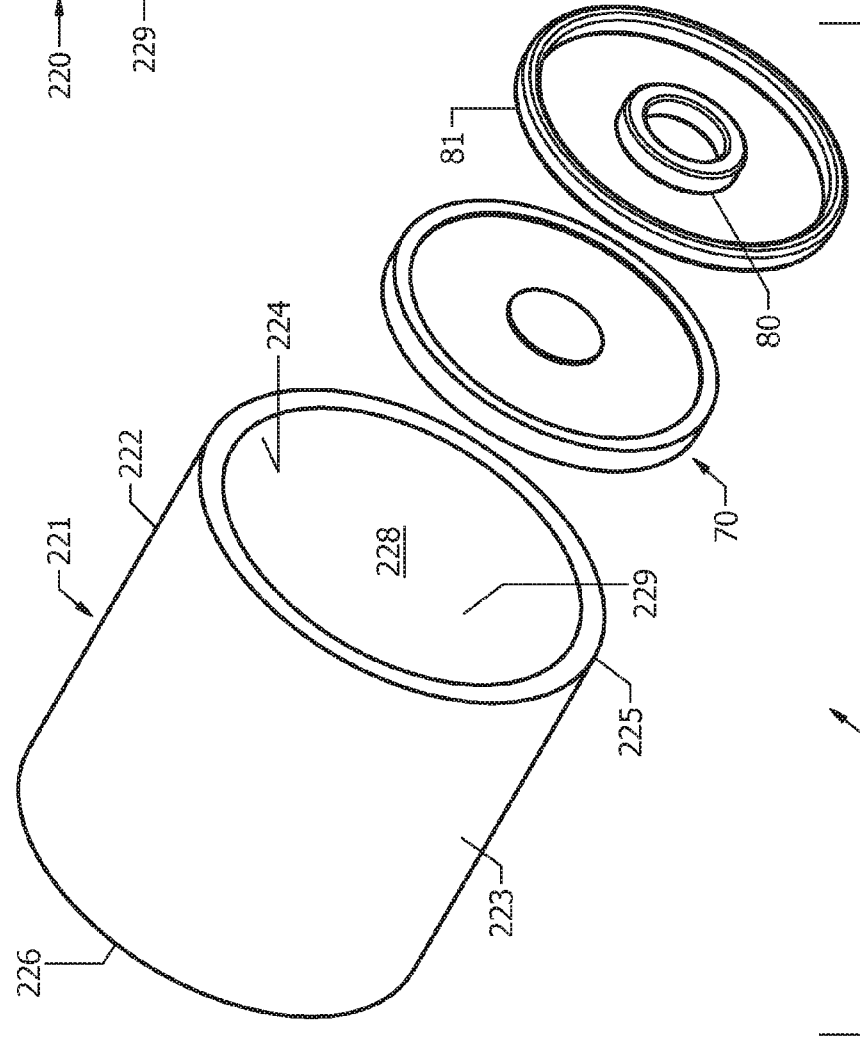
FIG. 36 is an exploded isometric view of yet still a further embodiment of a coaxial cable terminator assembly constructed and arranged in accordance with the principle of the invention.

FIG. 36 is an exploded isometric view of yet still a further embodiment of a coaxial cable terminator 220 constructed and arranged in accordance with the principle of the invention, and FIG. 37 is a section view of the embodiment of FIG. 36 shown as it would appear assembled. Referring to FIGS. 36 and 37 in relevant part, terminator 220 is an assembly and includes cap 221, termination assembly 70, inner contact 80, and outer contact 81. Cap 221, formed of plastic, ceramic, or other non-conductive material or combination of materials, includes continuous sidewall 222 having outer surface 223, inner surface 224, upper end 225, lower end 226, and a bottom 227 affixed to lower end 226. In FIG. 37, inner surface 227A of bottom 227 cooperates with inner surface 224 of continuous sidewall 222 to form receiving area 228 in cap 221. Upper end 225 encircles opening 229 to receiving area 228. Recessed pocket 232 is formed centrally into inner surface 227A of bottom 227, and from there recess 234 is formed in bottom 227 for accommodating resistors of a PCB termination assembly, such as termination assembly 150 discussed above. Termination assembly 70 is positioned in receiving area 228 as discussed above in terminator 50, but in this embodiment is positioned in recessed pocket 232 and secured in recessed pocket 232 with a non-conductive adhesive, and a friction fit can be used in an alternate embodiment. Cap 221 is formed integrally, is cylindrical in this example, and is symmetrical about its central axis.

Figure 38:
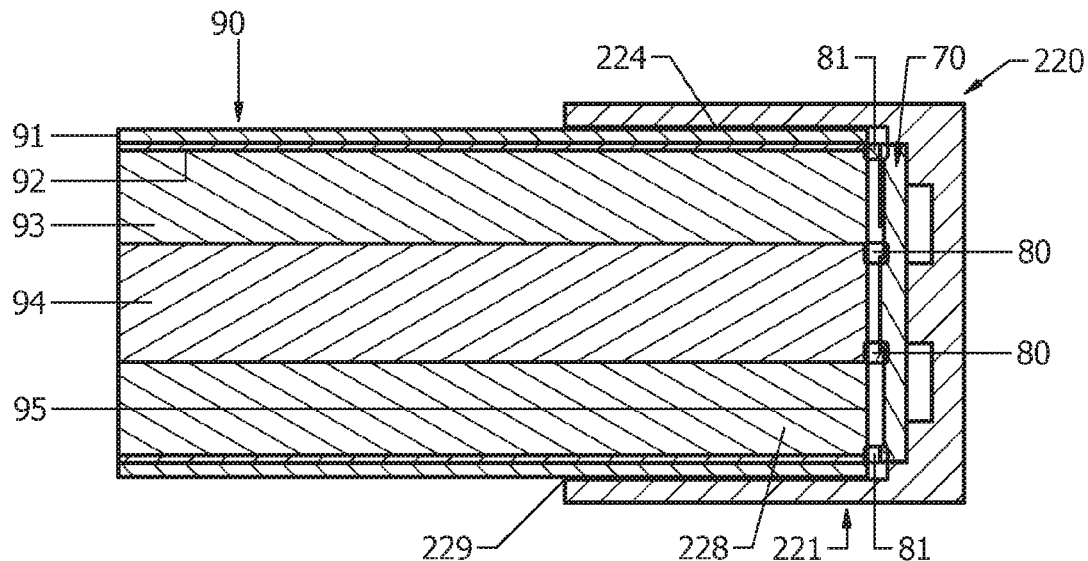
FIGS. 38-41 are section views corresponding to FIG. 37 illustrating different configurations of coaxial cables shown as they would appear terminated with the terminator assembly of FIGS. 36 and 37.

FIGS. 38-41 are section views corresponding to FIG. 37 illustrating different configurations of coaxial cables shown as they would appear terminated with the terminator 220. In FIG. 38, cable 90 includes outer jacket 91, outer conductor 92, dielectric 93, and inner conductor 94. End 95 of cable 90 is not stripped of outer jacket 91. End 95 is inserted into receiving area 228 through opening 229 in cap 221. Cap 221 is pressed onto and over end 95. Concurrently, inner surface 224 frictionally engages outer jacket 91 of cable 90 end 95, outer conductor 92 of cable 90 end 95 electrically contacts outer contact 81, and inner conductor 94 of cable 90 end 95 electrically contacts inner contact 80 terminating cable 90 end 95 with termination assembly 70.

Figure 39:
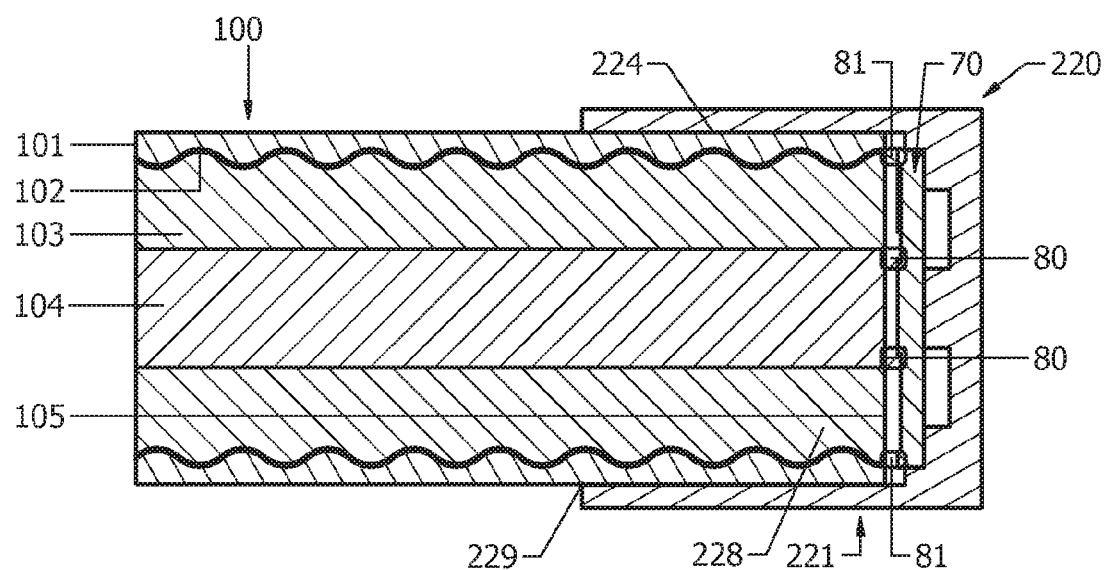

In FIG. 39, cable 100 includes outer jacket 101, outer conductor 102, dielectric 103, and inner conductor 104. End 105 of cable 100 is not stripped of outer jacket 101. End 105 is inserted into receiving area 228 through opening 229 in cap 221. Cap 221 is pressed onto and over end 105. Concurrently, inner surface 224 frictionally engages outer jacket 91 of cable 100 end 105, outer conductor 102 of cable 100 end 105 electrically contacts outer contact 81, and inner conductor 104 of cable 100 end 105 electrically contacts inner contact 80, terminating cable 100 end 105 with termination assembly 70.

Figure 40:
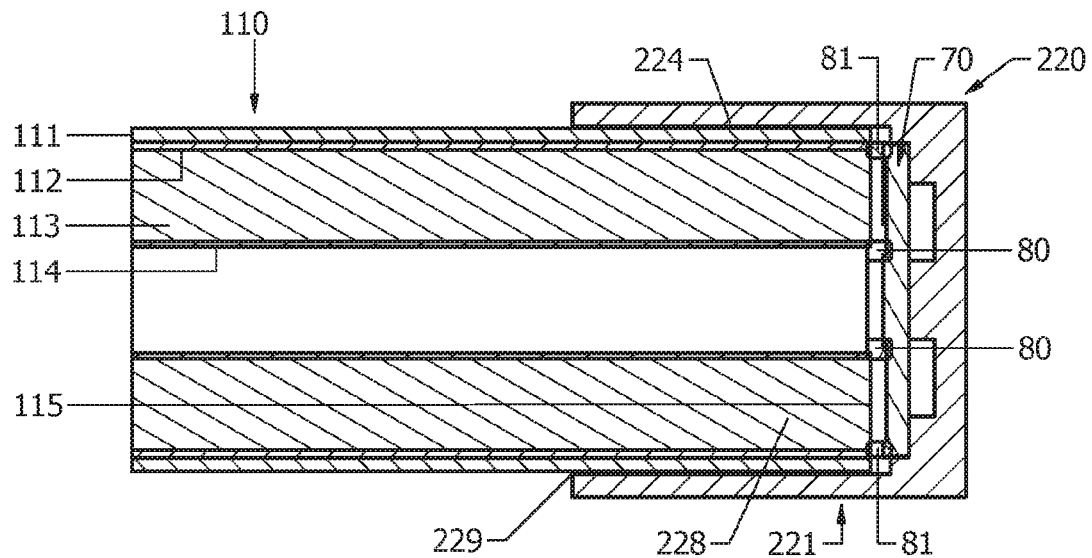

In FIG. 40, cable 110 includes outer jacket 111, outer conductor 112, dielectric 113, and inner conductor 114. End 115 of cable 110 is not stripped of outer jacket 111. End 115 is inserted into receiving area 228 through opening 229 in cap 221. Cap 221 is pressed onto and over end 115. Concurrently, inner surface 224 frictionally engages outer jacket 111 of cable 110 end 115, outer conductor 112 of cable 110 end 115 electrically contacts outer contact 81, and inner conductor 114 of cable 110 end 115 encircles and electrically contacts inner contact 80, terminating cable 110 end 115 with termination assembly 70.

Figure 41:
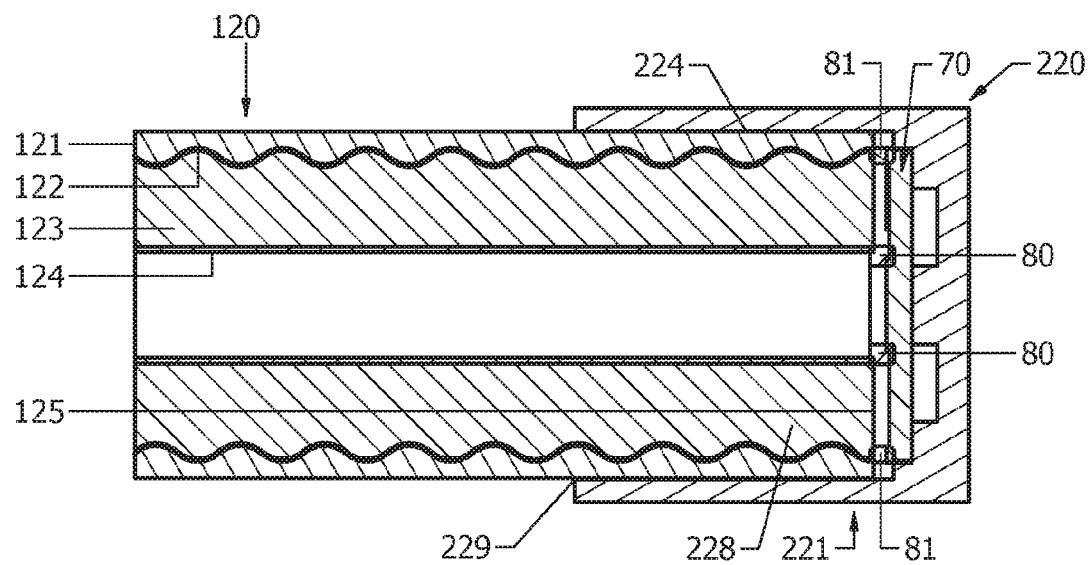

In FIG. 41, cable 120 includes outer jacket 121, outer conductor 122, dielectric 123, and inner conductor 124. End 125 of cable 120 is not stripped of outer jacket 121. End 125 is inserted into receiving area 228 through opening 229 in cap 221. Cap 221 is pressed onto and over end 125. Concurrently, inner surface 224 frictionally engages outer jacket 121 of cable 120 end 125, outer conductor 122 of cable 120 end 125 electrically contacts outer contact 81, and inner conductor 124 of cable 120 end 125 encircles and electrically contacts inner contact 80, terminating cable 120 end 125 with termination assembly 70.

G.

FIG. 42 is an exploded isometric view of a still another embodiment of a coaxial cable terminator 240 constructed and arranged in accordance with the principle of the invention, and FIG. 43 is a section view of the embodiment of FIG. 42 shown as it would appear assembled. Terminator 240 is an assembly and includes cap 221 discussed above, termination assembly 150 discussed above, and inner and outer contacts 80 and 81. Cap 221 has continuous sidewall 222, outer surface 223, inner surface 224, upper end 225, lower end 226, bottom 227, inner surface 227A, receiving area 228, opening 229, recessed pocket 232 in inner surface 227A of bottom 227, and recess 234. Termination assembly 150 is positioned in receiving area 228 and is installed onto recessed pocket 232 above recess 234. Resistors 158 are located in recess 234.

Figure 44:
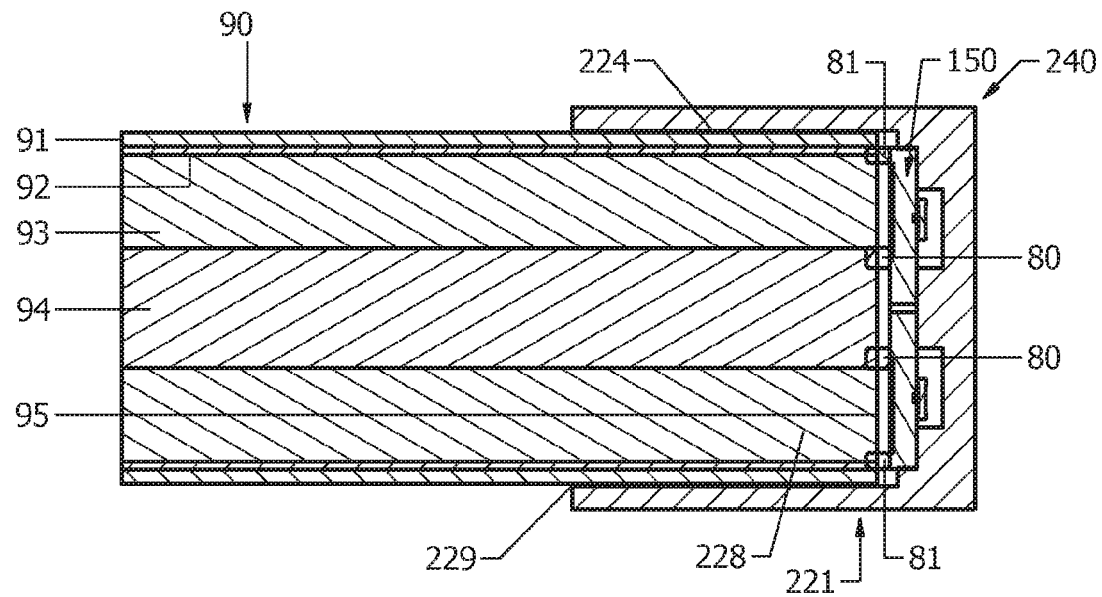
FIGS. 44-47 are section views corresponding to FIG. 43 illustrating different configurations of coaxial cables shown as they would appear terminated with the terminator assembly of FIGS. 42 and 43.

FIGS. 44-47 are section views corresponding to FIG. 43 illustrating different configurations of coaxial cables shown as they would appear terminated with the terminator 240. In FIG. 44, cable 90 includes outer jacket 91, outer conductor 92, dielectric 93, and inner conductor 94. End 95 of cable 90 is not stripped of outer jacket 91. End 95 is inserted into receiving area 228 through opening 229 in cap 221. Cap 221 is pressed onto and over end 95. Concurrently, inner surface 224 frictionally engages outer jacket 91 of cable 90 end 95, outer conductor 92 of cable 90 end 95 electrically contacts outer contact 81, and inner conductor 94 of cable 90 end 95 electrically contacts inner contact 80 terminating cable 90 end 95 with termination assembly 150.

Figure 45:
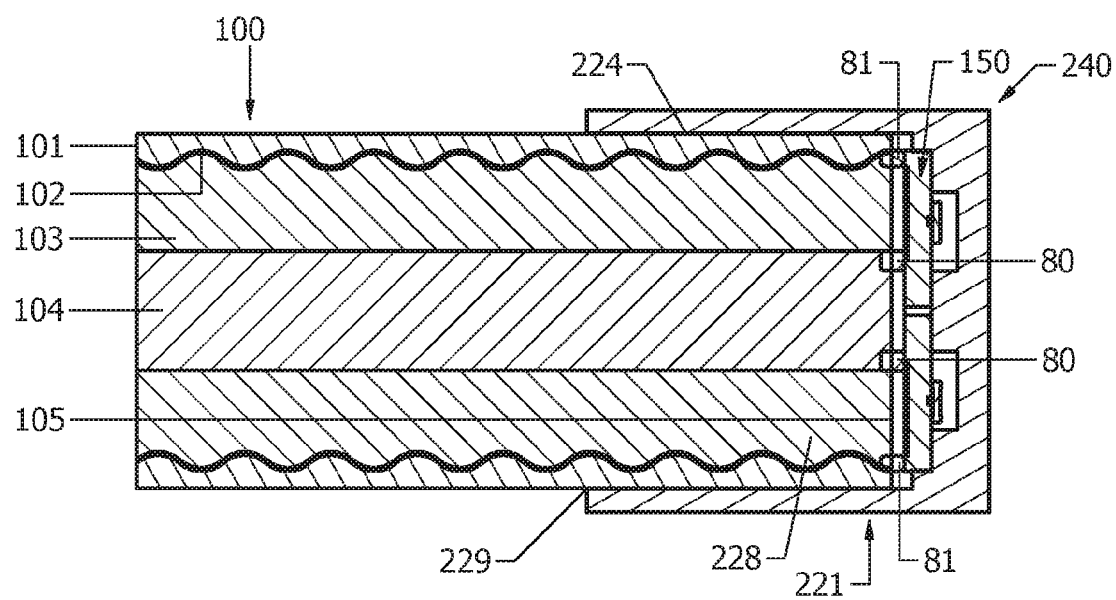

In FIG. 45, cable 100 includes outer jacket 101, outer conductor 102, dielectric 103, and inner conductor 104. End 105 of cable 100 is not stripped of outer jacket 101. End 105 is inserted into receiving area 228 through opening 229 in cap 221. Cap 221 is pressed onto and over end 105. Concurrently, inner surface 224 frictionally engages outer jacket 101 of cable 100 end 105, outer conductor 102 of cable 100 end 105 electrically contacts outer contact 81, and inner conductor 104 of cable 100 end 105 electrically contacts inner contact 80, terminating cable 100 end 105 with termination assembly 150.

Figure 46:
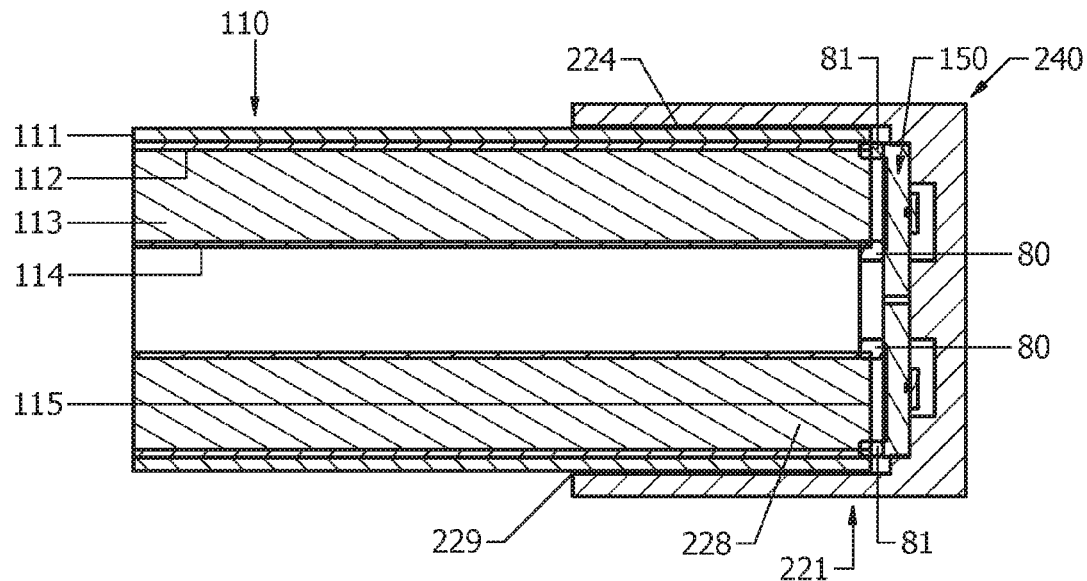

In FIG. 46, cable 110 includes outer jacket 111, outer conductor 112, dielectric 113, and inner conductor 114. End 115 of cable 110 is not stripped of outer jacket 111. End 115 is inserted into receiving area 228 through opening 229 in cap 221. Cap 221 is pressed onto and over end 115. Concurrently, inner surface 224 frictionally engages outer jacket 111 of cable 110 end 115, outer conductor 112 of cable 110 end 115 electrically contacts outer contact 81, and inner conductor 114 of cable 110 end 115 encircles and electrically contacts inner contact 80, terminating cable 110 end 115 with termination assembly 150.

Figure 47:
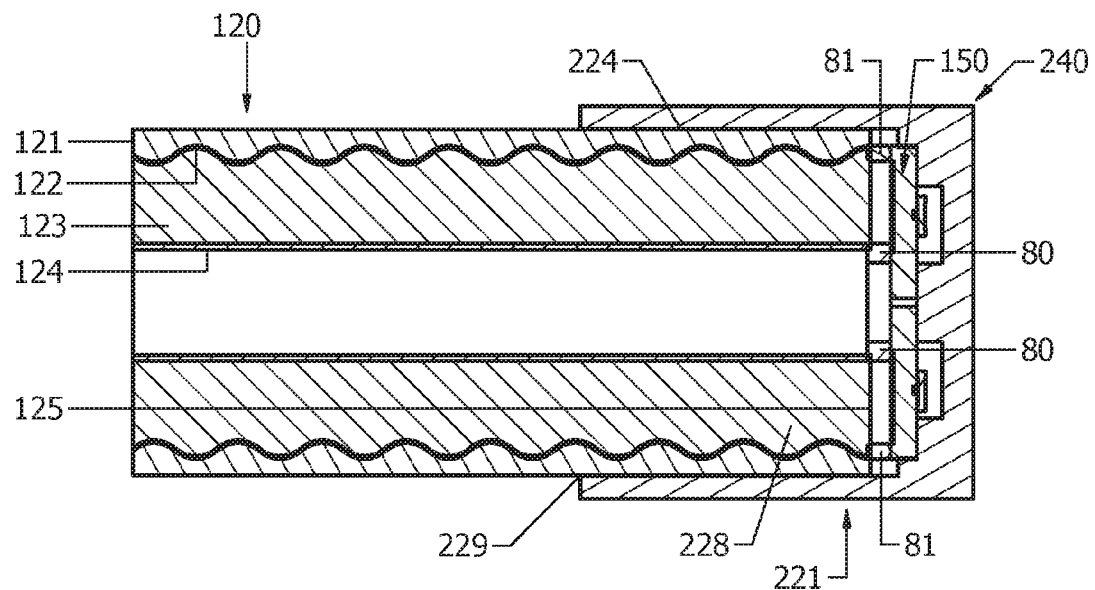

In FIG. 47, cable 120 includes outer jacket 121, outer conductor 122, dielectric 123, and inner conductor 124. End 125 of cable 120 is not stripped of outer jacket 121. End 125 is inserted into receiving area 228 through opening 229 in cap 221. Cap 221 is pressed onto and over end 125. Concurrently, inner surface 224 frictionally engages outer jacket 121 of cable 120 end 125, outer conductor 122 of cable 120 end 125 electrically contacts outer contact 81, and inner conductor 124 of cable 120 end 125 encircles and electrically contacts inner contact 80, terminating cable 120 end 125 with termination assembly 150.

The present invention is described above with reference to illustrative embodiments. However, those skilled in the art will recognize that changes and modifications may be made in the described embodiments without departing from the nature and scope of the present invention. Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A coaxial cable terminator assembly, comprising:
 a cap, the cap is non-conductive and defines a receiving area adapted to receive an end of a coaxial cable;
 a substrate, the substrate is electrically insulative, is carried by the cap in the receiving area, and has outer and inner termination connections and an electrically resistive connector, the electrically resistive connector electrically connects the outer termination connection to the inner termination connection;
 outer and inner contacts electrically connected to the outer and inner termination connections, respectively; and
 the outer and inner contacts are for electrically contacting coaxial outer and inner conductors, respectively, of the end of the coaxial cable for terminating the end of the coaxial cable, and the cap is for frictionally and non-conductively engaging the coaxial cable, when the end of the coaxial cable is inserted into the receiving area.

2. The coaxial cable terminator assembly according to claim 1, further comprising:
 a pocket formed in the cap; and
 the substrate is applied to the pocket.

3. The coaxial cable terminator assembly according to claim 1, wherein the electrically resistive connector comprises a printed circuit.

4. The coaxial cable termination assembly according to claim 1, wherein the outer and inner termination connections are coaxial.

5. The coaxial cable termination assembly according to claim 4, wherein the outer and inner contacts are coaxial.

6. A coaxial cable terminator assembly, comprising:
 a cap, the cap is non-conductive and includes a continuous sidewall having an outer surface, an inner surface, an upper end, a lower end, and a bottom affixed to the lower end, the bottom cooperates with the inner surface of the continuous sidewall to form a receiving area in the cap, the upper end encircles an opening to the receiving area, and the receiving area is adapted to receive an end of a coaxial cable inserted into the receiving area through the opening;
 a substrate, the substrate is electrically insulative, is carried by the bottom of the cap in the receiving area, and has outer and inner termination connections and an electrically resistive connector, the electrically resistive connector electrically connects the outer termination connection to the inner termination connection;
 outer and inner contacts electrically connected to the outer and inner termination connections, respectively; and
 the outer and inner contacts are for electrically contacting coaxial outer and inner conductors, respectively, of the end of the coaxial cable for terminating the end of the coaxial cable, and the inner surface of the cap is for frictionally and non-conductively engaging the coaxial cable, when the end of the coaxial cable is inserted into the receiving area through the opening.

7. The coaxial cable terminator assembly according to claim 6, further comprising:

a pocket formed in the bottom of the cap; and the substrate is applied to the pocket.

8. The coaxial cable terminator assembly according to claim 6, wherein the electrically resistive connector comprises a printed circuit.

9. The coaxial cable termination assembly according to claim 6, wherein the outer and inner termination connections are coaxial.

10. The coaxial cable termination assembly according to claim 9, wherein the outer and inner contacts are coaxial.

\* \* \* \* \*